(12) United States Patent
Haartsen et al.

(10) Patent No.: US 8,712,483 B2
(45) Date of Patent: Apr. 29, 2014

(54) WAKE-UP RADIO SYSTEM

(75) Inventors: Jacobus Cornelis Haartsen, Hardenberg (NL); Geert Henrik Weinans, Klijndijk (NL)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 635 days.

(21) Appl. No.: 12/617,213

(22) Filed: Nov. 12, 2009

(65) Prior Publication Data
US 2010/0112950 A1     May 6, 2010

Related U.S. Application Data

(63) Continuation-in-part of application No. 12/501,053, filed on Jul. 10, 2009, and a continuation-in-part of application No. 11/954,106, filed on Dec. 11, 2007.

(51) Int. Cl.
| | |
|---|---|
| *H04B 7/00* | (2006.01) |
| *H04B 1/16* | (2006.01) |
| *H04M 1/00* | (2006.01) |
| *H04B 1/38* | (2006.01) |
| *G08C 17/00* | (2006.01) |

(52) U.S. Cl.
USPC ........ 455/574; 455/343.2; 455/41.2; 370/311

(58) Field of Classification Search
USPC ................ 455/41.2, 41.3, 68, 69, 574, 343.1, 455/343.2; 370/311
See application file for complete search history.

(56) References Cited

U.S. PATENT DOCUMENTS

| 5,940,431 | A | 8/1999 | Haartsen et al. |
| 6,061,388 | A | 5/2000 | Saulnier et al. |
| 6,823,186 | B2 * | 11/2004 | Salokannel et al. ........ 455/452.1 |
| 7,340,215 | B2 | 3/2008 | Yokoshi et al. |
| 7,454,171 | B2 | 11/2008 | Palin et al. |
| 7,539,457 | B2 * | 5/2009 | Lim et al. ..................... 455/41.2 |
| 7,809,012 | B2 * | 10/2010 | Ruuska et al. ................ 370/449 |

(Continued)

FOREIGN PATENT DOCUMENTS

| EP | 1545069 A1 | 6/2005 |
| FR | 2820597 A1 | 8/2002 |

(Continued)

OTHER PUBLICATIONS

Hall, E.S. et al., RF Rendez-blue: reducing power and inquiry costs in bluetooth-enabled mobile systems, Computer Communications and Networks, 2002. Proceedings. Eleventh International Conference on Oct. 14-16, 2002, Piscataway, NJ, USA, pp. 640-645.

(Continued)

*Primary Examiner* — Andrew Wendell
(74) *Attorney, Agent, or Firm* — Sreenivas Vedantam; Moore & Van Allen PLLC

(57) ABSTRACT

Systems and methods may include a master device. The master device may include a wake-up transmitter to send a wake-up message to a slave device to wake-up the slave device. The master device may also include a short-range transmitter to communicate with the slave device once the slave device has been woken up. The master device may be a mobile phone that communicates with the slave device (e.g., Bluetooth accessory devices) over a Bluetooth network.

20 Claims, 18 Drawing Sheets

(56) References Cited

U.S. PATENT DOCUMENTS

| | | | |
|---|---|---|---|
| 2001/0024474 A1 | 9/2001 | Rakib et al. | |
| 2002/0176445 A1 | 11/2002 | Melpignano | |
| 2003/0058808 A1 | 3/2003 | Eaton et al. | |
| 2003/0060161 A1 | 3/2003 | Park | |
| 2004/0106424 A1* | 6/2004 | Yoshizawa | 455/522 |
| 2004/0147267 A1* | 7/2004 | Hill et al. | 455/456.1 |
| 2004/0229569 A1* | 11/2004 | Franz | 455/66.1 |
| 2005/0055374 A1 | 3/2005 | Sato | |
| 2005/0160301 A1* | 7/2005 | Disser | 713/310 |
| 2006/0009240 A1 | 1/2006 | Katz | |
| 2006/0111187 A1 | 5/2006 | Miyazaki | |
| 2006/0128308 A1 | 6/2006 | Michael et al. | |
| 2007/0047506 A1 | 3/2007 | Froehling et al. | |
| 2007/0140154 A1* | 6/2007 | Chun | 370/311 |
| 2007/0140253 A1 | 6/2007 | Daigle | |
| 2007/0173270 A1 | 7/2007 | Block et al. | |
| 2007/0184880 A1* | 8/2007 | Frank | 455/574 |
| 2007/0242026 A1 | 10/2007 | Julian et al. | |
| 2007/0275746 A1 | 11/2007 | Bitran | |
| 2007/0287381 A1 | 12/2007 | Hulvey | |
| 2007/0287542 A1 | 12/2007 | Miyazaki et al. | |
| 2008/0070632 A1* | 3/2008 | Obuchi et al. | 455/561 |
| 2008/0102861 A1 | 5/2008 | Linsky et al. | |

FOREIGN PATENT DOCUMENTS

| | | |
|---|---|---|
| WO | WO 98/28926 | 7/1998 |
| WO | WO 02/089410 | 11/2002 |
| WO | 03034645 | 4/2003 |
| WO | 03065289 A1 | 8/2003 |
| WO | WO 2004/038938 | 5/2004 |
| WO | WO 2006/013310 | 2/2006 |
| WO | 2007069901 A1 | 6/2007 |
| WO | 2007127884 A2 | 11/2007 |
| WO | 2008006077 A2 | 1/2008 |
| WO | 2009033826 A1 | 3/2009 |
| WO | 2009078575 A1 | 6/2009 |
| WO | 2009127859 A1 | 10/2009 |

OTHER PUBLICATIONS

Bluetooth Sig: "Specification of the Bluetooth System: Master Table of Contents and Compliance Requirements; Covered Core Package Version: 2.1+EDR", Internet Citation. Jul. 26, 2007, pp. 1-11.
International Search Report; Feb. 15, 2011; issued in International Patent Application No. PCT/EP2010/065788.
Written Opinion of the International Searching Authority; Feb. 15, 2011; issued in International Patent Application No. PCT/EP2010/065788.
Dennis L. Goeckel et al., Slightly Frequency-Shifted Reference Ultra-Wideband (UWB) Radio, IEEE Transactions on Communications, Mar. 1, 2007, vol. 55, No. 3, IEEE Service Center, Piscataway, NJ.
Zhang, Q. et al., Multiple Access Slightly Frequency-Shifted Reference Ultra-Wideband Communications for Dense Multipath Channels, Communications, 2007. ICC '07, IEEE International Conference, Jun. 1, 2007, pp. 1083-1088.
International Search Report, corresponding to International Patent Application No. PCT/US2009/067288, dated May 6, 2010.
Written Opinion, corresponding to International Patent Application No. PCT/US2009/067288, dated May 6, 2010.
International Search Report; Dec. 23, 2010; issued in International Patent Application No. PCT/US2010/052223.
Written Opinion of the International Searching Authority; Dec. 23, 2010; issued in International Patent Application No. PCT/US2010/052223.
International Search Report; Dec. 29, 2010; issued in International Patent Application No. PCT/US2010/052221.
Written Opinion of the International Searching Authority; Dec. 29, 2010; issued in International Patent Application No. PCT/US2010/052221.
J.C. Haartsen, X. Shang, J.W. Balkema, A. Meijerink and J.L. Tauriz, "A new wireless modulation scheme based on frequency-offset", $12^{th}$ Annual Symposium of the IEEE/CVT, Nov. 3, 2005, pp. 1-7.
Jing Wang and Japp C. Haartsen, "Performance of Transmit-Reference Radio System in Frequency-selective Fading Channels", $12^{th}$ Annual Symposium of the IEEE/CVT, Nov. 3, 2005, pp. 1-7.
International Search Report and Written Opinion from Application No. PCT/EP2008/051142 mailed Jun. 5, 2008.
U.S. Appl. No. 12/616,854, filed Nov. 12, 2009.
U.S. Appl. No. 12/617,097, filed Nov. 12, 2009.
International Preliminary Report on Patentability; Jan. 19, 2012; issued in International Patent Application No. PCT/US2009/067288.
International Preliminary Report on Patentability; May 15, 2012; issued in International Patent Application No. PCT/US2010/052221.
International Preliminary Report on Patentability; May 15, 2012; issued in International Patent Application No. PCT/US2010/052223.

* cited by examiner

| State | Max. latency (s) | Min. latency (s) |
|---|---|---|
| "3 ID slow recovery" | 56 | 28 |
| "2 ID slow recovery" | 59 | 30 |
| Bluetooth page | 21 | 11 |

| State | Max. latency (s) | Min. latency (s) |
|---|---|---|
| Option 1 | 10 | 5 |
| Option 2 | 24 | 12 |
| Bluetooth page | 2.56 | 1.28 |

WAKE-UP RADIO SYSTEM

CROSS REFERENCE TO RELATED APPLICATIONS

This application claims benefit of priority as a continuation-in-part to the filing date of U.S. patent application Ser. No. 12/501,053, as filed on Jul. 10, 2009, and as a continuation-in-part to the filing date of U.S. patent application Ser. No. 11/954,106, as filed on Dec. 11, 2007, both of which are incorporated herein by reference in their respective entireties.

BACKGROUND

Currently, short-range radio communication systems (e.g. WLAN 802.11, Bluetooth, ZigBee, Z-Wave, etc.) use a bi-directional data exchange. These systems are based on connections that are controlled by higher-layer applications. To achieve short latencies, radio receivers need to scan frequently or are locked into low-duty cycle connections. Low latency and low power are difficult to achieve simultaneously.

SUMMARY OF THE INVENTION

In accordance with an embodiment of the present invention, a radio system includes a master device. The master device may include a wake-up transmitter to send a wake-up message to a slave device to wake-up the slave device. The master device may also include a short-range transmitter to communicate with the slave device once the slave device has been woken up. The master device may be a mobile phone that communicates with the slave device (e.g., Bluetooth accessory devices) over a Bluetooth network.

In accordance with another embodiment of the present invention, a radio system includes a slave comprising a short-range transmitter and a wake-up radio receiver, wherein the slave is configured to have a sniff sub-rating with a master, the master being configured to wake up the slave via the wake-up radio receiver.

In accordance with another embodiment, a method is directed to communicating a master device with a slave device over a short-range network. The method may include establishing a sniff period from the slave to the master; establishing a subrating period from the master to the slave, wherein the subrating period is greater than the sniff period; and allowing the slave device to wake up during the subrating period so that at the next sniff period the slave communicates with the master.

Other aspects and features of the present invention, as defined solely by the claims, will become apparent to those ordinarily skilled in the art upon review of the following non-limiting detailed description of the invention in conjunction with the accompanying figures.

DETAILED DESCRIPTION

Figure 1A:
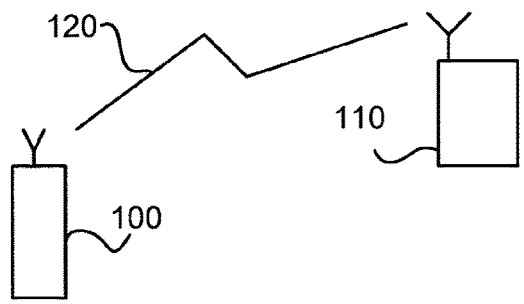
FIG. 1A illustrates a master unit and a slave unit communicatively connectable to each other in a frequency hopping communications system.

The following detailed description of embodiments refers to the accompanying drawings, which illustrate specific embodiments of the invention. Other embodiments having different structures and operations do not depart from the scope of the present invention.

Embodiments of the present invention may take the form of an entirely hardware embodiment that may be generally be referred to herein as a "module", "device" or "system."

Embodiments of the present invention will be described more fully hereinafter with reference to the accompanying drawings, in which some embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to persons skilled in the art.

Generally, low power consumption in radio systems is achieved by applying very low duty cycle's on the link therebetween. If a radio system only operates for 1 ms every second, a 1000× power advantage may obtained. Further power reduction can be achieved by extending the interval between the wake-ups. However, this poses two issues: (1) the latency increases as the devices cannot be reached during the sleep interval; and (2) the transmitter receiver may get out of sync, which is especially an issue in frequency hopping (FH) systems. The latter issue is addressed below in the section titled "AUTOMATIC RECONNECTION OF A PREVIOUSLY LOST CONNECTION IN A FREQUENCY HOPPING COMMUNICATION SYSTEM." As is discussed later, this concept keeps Bluetooth devices (or other short-range radio communication devices) loosely synchronized even if no data was exchanged.

Additionally, as discussed in the section titled "LOW POWER RADIO SYSTEM," a low-power uni-directional radio system, which has an extremely low power receiver, can be applied as a wake-up radio for other more power hungry systems.

As described in the section titled "WAKE-UP ASSISTED SNIFF LINK WITH SUB-RATING," the low-power uni-directional wake-up radio can be used with a Bluetooth's sniff link to achieve an overall system that combines low latency with low power.

As a general overview, some concepts disclosed herein apply sub-rating on a Bluetooth link combined with a wake-up radio to maintain a short response time in an accessory of a Bluetooth system or other short-range system. With sub-rating, the accessory can sleep for extensive times (up to hours if we apply the automatic reconnect concepts as described below in the section titled "AUTOMATIC RECONNECTION OF A PREVIOUSLY LOST CONNECTION IN A FREQUENCY HOPPING COMMUNICATION SYSTEM") while keeping a short latency from the accessory to a mobile device (e.g., the mobile device keeps a sniff/reconnect interval of 1.28 s). To obtain a short latency also from the mobile device to the accessory while the accessory Bluetooth radio sleeps for hours, a wake-up radio is used with which the mobile device can wake-up the accessory.

Thus, embodiments of the present invention combine sub-rating (possibly extended with the auto-reconnect features) with a wake-up radio to obtain both low latency and a low standby current.

I. Automatic Reconnection of a Previously Lost Connection in a Frequency Hopping Communication System FIG. 1A shows a master unit 100 and a slave unit 110 in a frequency hopping (FH) communications system. The master unit 100 and the slave unit 110 may be communicatively connected to each other via a communication link or connection 120 in the FH system. In order to facilitate the understanding of the present invention, a Bluetooth sniff mode will be considered as the FH system in the following disclosure. The Bluetooth sniff mode is a low power mode, which is generally applied when little activity is expected on the link 120 while a low latency is desired for a fast response, e.g. response times in the order of one second. A main purpose of the Bluetooth sniff mode is generally to maintain the timing and frequency-hop synchronization between the units 100, 110. This may require periodic contact between the master unit 100 and the slave unit 110. The sleep interval may e.g. depend on i) the latency requirements, and ii) the mutual drift between the clock references in the master and slave units 100, 110. For latency reasons, the sleep interval may, preferably, be approximately 1.28 seconds. Therefore, the default interval of 1.28 seconds is assumed throughout this disclosure.

Figure 1B:
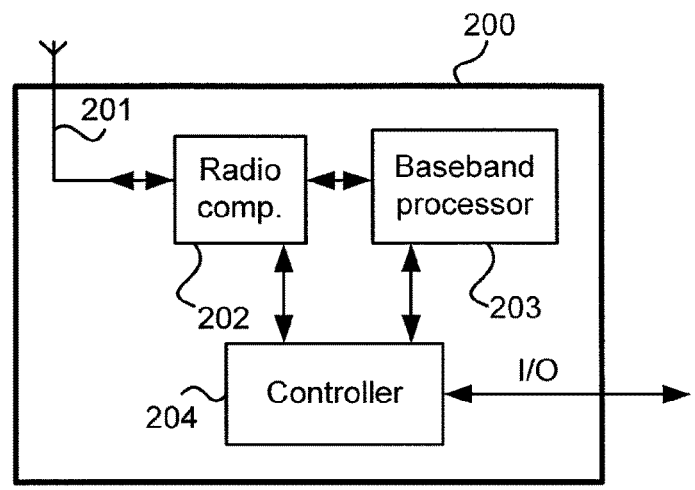
FIG. 1B is a block diagram of an embodiment of a transceiver unit, which may be implemented in the units shown in FIG. 1A.
Figure 1C:
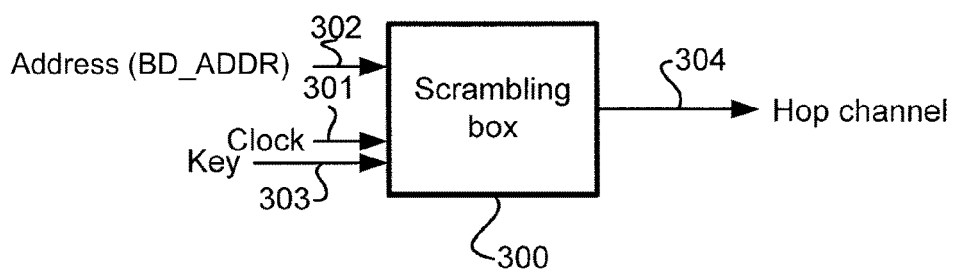
FIG. 1C is a block diagram of conventional means for performing hop selection.

An example of a frequency-hopping transceiver unit 200 is shown in FIG. 1B. Master units 100 of the FH system may incorporate the frequency-hopping transceiver unit 200. Also, slave units 110 of the FH system may incorporate the frequency-hopping transceiver unit 200. The transceiver unit 200 comprises an antenna 201, a radio component 202, a baseband processor 203 and a controller 204. The baseband processor 203 may provide frames of information bits to the radio unit 202. The radio unit 202 may then modulate and up convert the modulated signal to the proper hop frequency, and transmit the signal via the antenna 201. The radio unit 202 may transmit TX frames in different hop frequencies according to a pseudo-random FH sequence. RX frames may be received either in between the TX frames, or alternatively, they may be received simultaneously with the transmission of the TX frame. To minimize interference between transceivers supporting different links, each link may apply a unique hop sequence. The cross correlation between different hop sequences should, preferably, be small in order to minimize collisions of frames of different links. Error correction protocols to overcome collisions should, preferably, also be implemented. In an exemplary FH system, each transceiver unit 200 has a unique address (BD_ADDR or Bluetooth address) and a free-running clock. The BD_ADDR may be considered as the user address. The BD_ADDR may select the FH sequence that will be used. The clock may determine the phase in the sequence, that is, which particular hop channel of the sequence is selected at a specific time. An embodiment of a conventional means for performing hop selection is illustratively shown in FIG. 1C. This figure shows a scrambling box 300 in which a hop channel is derivable from the clock 301, an BD_ADDR 302, and (optionally) a unique encryption key 303 in a pseudo-random way. Each time the clock 301 is updated, a new hop channel 304 may be selected according to a pseudo-random algorithm implemented in the scrambling box 300. Two units 100, 110 that are connected may use the same BD_ADDR, the same clock and, if present, the same encryption key for the duration of the connection. Once connected, a mechanism may be applied to keep the two clocks synchronized. This may, for example, be achieved by synchronization bit-sequences in the frame headers that indicate an early or late reception, which can then be used to slow down or speed up the clock rate, respectively. If a leaky mechanism in the clock update is applied, the two units may be loosely connected at an intermediate clock rate.

Figure 2:
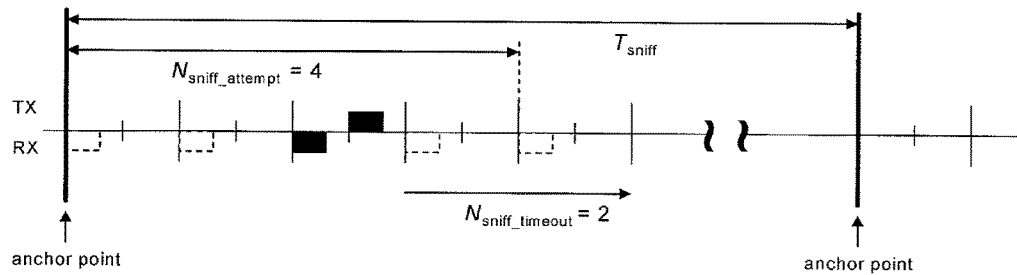
FIG. 2 illustrates a timing diagram of a Bluetooth sniff timing mode.

FIG. 2 illustrates a timing diagram of an exemplary Bluetooth sniff timing mode. A slave unit 110 in sniff mode may wake up periodically in order to listen to transmissions from the master unit 100 and in order to re-synchronize its clock offset. In the sniff mode, the duty cycle of the slave unit's 110 listening activity may be reduced. If a slave unit 110 participates on a certain link, it may have to listen in every slot to the master unit traffic. With the sniff mode, the time slots where the master unit 100 may start transmission to a specific slave unit 110 may be reduced; that is, the master unit 100 may start transmission in specified time slots. These so-called sniff slots are spaced regularly with an interval known as $T_{sniff}$, see FIG. 2. The slave unit 110 may begin to listen at the sniff slots for $N_{sniff}$ attempt consecutive receive slots unless a packet with a matching address is received. After every reception of a packet with a matching address, the slave unit 110 may continue listening at the subsequent $N_{sniff}$ timeout or remaining of the receive slots, whichever is greater. So, for $N_{sniff}$ timeout>0, the slave unit 110 may continue listening as long as it receives packets with a matching address. In order to enter the sniff mode, the master unit 100 or, alternatively, the slave unit 110 may issue a sniff command message. This sniff command message may contain the sniff interval $T_{sniff}$ and an offset $D_{sniff}$. The timing of the sniff mode is then determined. The illustrative timing diagram of a sniff mode shown in FIG. 2 uses a periodic scheme where anchor points are separated by the sniff interval $T_{sniff}$. The master unit 100 may send a packet in any of the $N_{sniff}$ attempt frames (in one exemplary embodiment, a frame may e.g. consist of a 625 µs master-to-slave slot followed by a 625 µs slave-to-master slot). The slave unit 110 may be required to listen on all $N_{sniff\_attempt}$ frames even if only the first frame is used. Once a packet sent from the master unit 100 has been received by the slave unit 110, the slave unit 110 may listen for at least $N_{sniff}$ timeout additional frames following the frame the last packet was received in. Since a slave unit 110 will normally listen for at least $N_{sniff\_attempt}$ frames, in addition to more flexibility in the transmitter, $N_{sniff}$ attempt>1 may generally provide extra robustness. If a packet reception fails, e.g. due to multipath fading, the master unit 100 may re-transmit at a different frequency but still in the same sniff interval $T_{sniff}$. During the sniff mode, the slave unit 110 may adjust its clock so that it may remain synchronized to the master unit 100. At the anchor points, the packet exchange may provide timing information to update the clock of the slave unit 110. However, also when no packets are exchanged, the clocks of the master unit 100 and slave unit 110, respectively, may remain loosely in sync due to the previous adjustments. The rate at which synchronization is lost may e.g. depend on the mutual drift between the clock references. Synchronization may be important for ad-hoc connections e.g. in a Bluetooth system. In the Bluetooth system, each unit 100, 110 has a free-running native clock which may have an accuracy of 20 ppm when the unit is active and up to e.g. 250 ppm when the unit is in a low-power power mode. When a unit 100 wants to page another unit 110, it may speed up the connection establishment when it knows the native clock of the receiving unit 110. This clock information should, therefore, preferably be stored during a previous connection stage. A unit may thus have a list of unit addresses with corresponding native clocks it may use when paging one of these units. The clock information may, e.g., be stored as a time offset to its own native clock. When a piconet is in operation, the native clock of the master unit 100 may determine the timing. The slave units 110 may add an offset to their own native clocks in order to be hop-synchronized to the master unit 100. The native clock of the slave unit 110 plus the offset with respect to the master unit 100 may provide the proper input to the hop selection scheme. Since the native clocks of the master unit and the slave unit(s) are free-running, the offset in the slave unit(s) 110 may have to be adjusted substantially continuously to compensate for drift. The reception of packets sent by the master unit 100 may be used to adjust the offset. Furthermore, an access code (derived from the master BD_ADDR) in front of the packet may have the proper autocorrelation properties to enable a slave unit 110 to derive the timing.

If a connection 120 between the master unit 100 and the slave unit 110 is lost during Bluetooth sniff mode the units 100, 110 would, in the known prior art, return to the well-known page and page scan modes to recover the connection 120. The master unit 110 would return to the page scan mode (with a duty cycle of about 0.9-1%) while the former master unit 100 would try one page lasting for about 10 seconds. If the connection 120 would not be recovered, the former master unit 100 would not page the slave unit 110 again. This recovery procedure may be costly with respect to power consumption. It would also not result in a successful recovery if the units were out of the coverage range for more than 10 seconds, i.e. the duration of the page. All in all, this means that the connection 120 would not be recovered automatically when the units come in range again, unless the interruption lasts less than said 10 seconds. Thus, in the known prior art, a user action would normally be required to re-connect the units again once they have lost their previous connection 120.

Embodiments of the present disclosure propose a recovery procedure, which allow for a more automatic recovery of a previously lost connection 120 between two units 100, 110 in a FH system, e.g. Bluetooth sniff mode, as compared to the known prior art. When a previous connection 120 between two units 100, 110 has been lost (e.g. due the fact that the two units 110, 110 have moved out of the coverage range of each other) a recovery of said connection 120 may be established and at the same time any excessive power consumption in the two units 100, 110 may be limited while acceptable latencies may be provided. Some embodiments of the present invention provide a substantially automatic recovery procedure for recovering a previously lost connection 120 between two units 100, 110 in a FH system, such as Bluetooth sniff mode. A recovery procedure is presented herein, which may have both a low-duty cycle page and a low-duty cycle page scan. This may be achieved by using clock information that was present during the last connection 120 between the two units 100, 110. The clock information may be available from free-running clocks in the respective units 100, 110. As time elapses, this clock information may be less reliable, e.g. due to clock drifts, which in turn requires a higher duty cycle. To this end, a recovery procedure having different recovery states is proposed herein. The recovery procedure may, preferably, be divided into a first recovery state (referred to as the fast recovery state in the following disclosure) and a second recovery state (referred to as the slow recovery state in the following disclosure). In the fast recovery state, the units 100, 110 may reconnect to each other within e.g. one second once the units come into the coverage range of each other again. If the units have not been reconnected (and, hence, re-synchronized) within a maximum time period $T_{FASTRECOVERY}$ of e.g. 30 minutes, the units may enter the slow recovery state. In the slow recovery state, the reconnection may take more time as compared to the fast recovery state, e.g. up to 30 seconds. It should be noted that the accuracy of the clock estimate may depend on the relative drift of the clocks in the two units 100, 110 as well as on the time elapsed since the two units exchanged their respective internal clock values during a connection. The larger the drift and the longer the time, the larger is the uncertainty in time and frequency and, hence, the longer the paging process may take. In the proposed system, the clocks are free-running. Clock offsets may be utilized in the estimation process. In this way, a unit may have a list of clock offsets with respect to one or several other units that it has been connected with in the past.

In the following, two exemplary embodiments of the inventive recovery procedure will be presented; more details can be found in the following. The building blocks used in the fast and slow recovery procedures may be based on the conventional paging scheme used in Bluetooth. For example, only ID packets may be used to exploit their robustness; the Device Access Code (DAC) of the slave unit 110 may preferably be used. Indeed, an ID packet comprises an direct-sequence (DS) code. This code may be related to the identity of the device in question (Device Access Code, DAC). Since it is a DS code, it may provide processing gain like in a direct-sequence spread spectrum system. In the receiving unit, the received ID packet is compared (correlated) with an exact replica of the code. If sufficient bits match, a reception may be announced. Depending on the threshold that is set in the system, it may be possible to accept the packet already when 80% or 90% of the bits match. This may provide the extra robustness to the system. Furthermore, the page hopping sequence belonging to the slave unit 110 may be used. These choices enable the master unit 100 to reach the slave unit 110 even using a conventional paging procedure. During recovery, the slave unit 110 will only scan periodically on a single hop frequency according to the page hopping sequence, similar to a conventional page scan. The recovery scan window may, however, be considerably shorter than the conventional page scan. For the slave unit 110, the difference between fast and slow recovery is only in the interval between scans, which may be somewhat longer in slow recovery than in fast recovery. The master unit 100 may transmit ID packets on different frequencies, but compared to conventional paging, the duty cycle may be much smaller.

Figure 3:
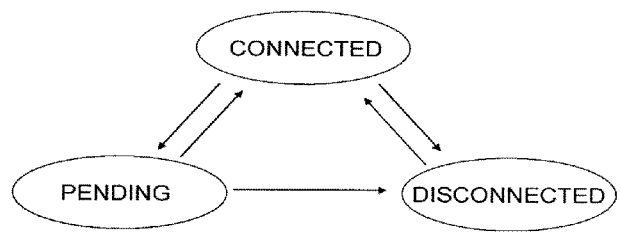
FIG. 3 illustrates a three-state model of a recovery procedure according to an embodiment of the invention at an application level.

FIG. 3 illustrates a three-state model of the recovery procedure at an application level. From an application point of view as shown in this figure, the link or connection 120 is either present (connected) or not (disconnected) between the master unit 100 and the slave unit 110. However, from a user perspective, a third state may be desirable: namely, "pending". The pending state indicates that the link has existed in the past, but is currently not present because the units are out of range. In order to become connected again, the user has to do no other action than just moving the units closer together. The link may then be re-established substantially automatically by means of a recovery procedure as disclosed herein. As a mere example, a headset application may be considered. In the connected state, the phone (master unit 100) display may e.g. show a headset icon, showing the user that all incoming and out-going calls will be directed to the headset (slave unit 110). In the disconnected state, no icon is present and the headset may not be used. In the pending state, the icon may be dashed or, alternatively, may contain a question mark. This may indicate to the user that he/she merely needs to move the headset closer to the phone in order to return to the connected state. The unit may move from connected state to pending state when a loss of link 120 is experienced (a timeout on the number of missed packets in a row). When the link 120 is recovered, the units 100, 110 may automatically move back from pending state to connected state. However, if the pending state lasts too long without any recovery, the unit may automatically move to the disconnected state. This would typically happen if the units have been in pending state for a couple of hours.

Figure 4:
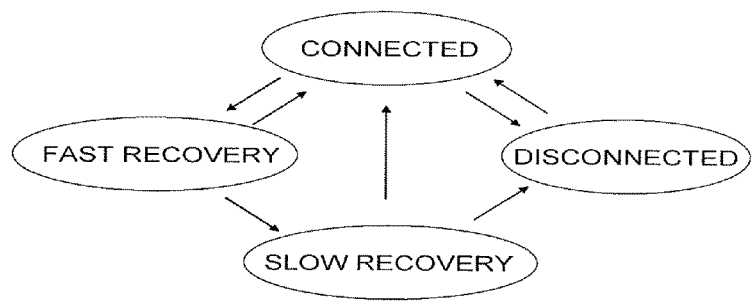
FIG. 4 illustrates a four-state model of a recovery procedure according to an embodiment of the invention at an PHY/MAC level.

FIG. 4 illustrates a four-state model of the recovery procedure at a PHY/MAC level. At PHY/MAC level, the recovery of link 120 may take place during the pending state. In order to maximally exploit the pre-knowledge of frequency and time, the recovery procedure in accordance with embodiments of the invention may be adapted to take into account the time elapsed since the last synchronization. The recovery scheme may dissipate more power as time passes since the uncertainty in time and frequency increases. As can be seen in FIG. 4, the recovery procedure is split into the first recovery state ("fast recovery") and the second recovery state ("slow recovery"), see FIG. 4. When the link 120 has been lost in e.g. the last 30 minutes, the user may expect a fast recovery when the units come into range again. If the link 120 has been lost for a longer time, a longer delay may be acceptable. If the link has been lost for a very long time (e.g. several hours), a user-initiated action may, however, be required to return to the connected state. These differences in latency may be exploited to optimize the overall power consumption.

In the following, two exemplary embodiments are presented in greater detail. It goes without saying that the various features described with reference to the two embodiments may also be combined in the same embodiment.

A. First Embodiment

During fast recovery, the time elapsed since the previous or last synchronization between master unit 100 and slave unit 110 is still sufficiently small (a couple of minutes up to e.g. maximum 30 minutes) to be able to predict the timing in the both units 100, 110 (see FIG. 1). The former slave unit 110 (e.g. a headset or a watch) enters a recovery scan state; the former master unit 100 (e.g. a mobile phone) enters a recovery page state. Important to mention is that both these states may be low duty cycle states (in contrast to the conventional page state in Bluetooth).

1. Fast Recovery Scan

Figure 5:
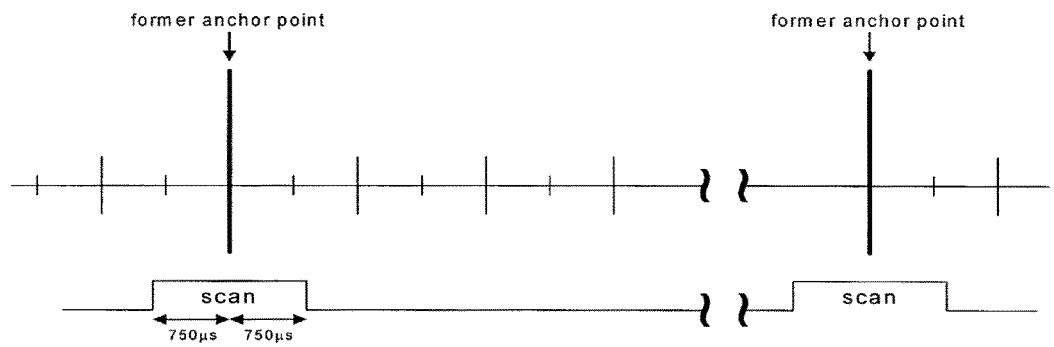
FIG. 5 illustrates a timing diagram of a fast recovery scan window according to an embodiment of the invention.

When a loss of link 120 (see FIG. 1) has been detected, the former slave unit 110 enters the fast recovery scan state. The initial timing of the scan window may be based on the anchor point timing experienced during sniff. That is, the center of the scan window may be placed at the former anchor point, see FIG. 5 which illustrates a timing diagram of the fast recovery scan window. The scan window may have a length of about 1.5 ms. The scan repetition period may be 1.28 s. This results in a duty cycle of about 0.1%. The hop frequency used may be selected from the 32-carrier page hopping sequence corresponding to the BD-ADDR of the slave unit 110. For each scan, a new hop carrier may be selected. The clock value k that is applied may be based on the former master clock as used when in sniff mode (alternatively, the slave native clock can be used, but then this slave clock or clock offset should have been communicated to the master while in sniff. For the moment, it may be assumed that the slave clock is unknown to the master)

During scan, the slave unit 110 may correlate the incoming signals against a known 68-bit access code related to the BD-ADDR of the slave unit 110. This may be an ID packet corresponding to the Device Access Code (DAC) also used in conventional page scan. When the core layer output exceeds a threshold, the slave unit 110 may be configured to enter a recovery response sub-state which may be identical to the Bluetooth page response sub-state. The slave unit 110 may be configured to return an identical ID packet at the proper timing and await the reception of a FHS packet. The FHS packet may then re-synchronize the timing and frequency hopping of the slave unit 110. The slave unit 110 may remain in recovery scan until the link 120 is re-established or when a timeout $T_{FASTRECOVERY}$ has exceeded indicating the end of the fast recovery state. Assuming a worst case mutual drift of e.g. 40 ppm, the timeout $T_{FASTRECOVERY}$ may, preferably, be set to about 30 minutes. It should be appreciated that the fast recovery scan is similar to the conventional Bluetooth page scan. A difference is, however, in the clock used for determining the hop frequencies and wake up timing. In the prior art scheme, it is the native clock of the slave unit 110 that sets the timing; in the fast recovery procedure disclosed here, it is the slave unit's estimate of the master clock that sets the timing.

2. Fast Recovery Page

When a loss of link 120 has been detected, the former master unit 100 enters the fast recovery page state. The initial timing of the fast recovery page may be based on the anchor point timing experienced during sniff mode. If an ID packet is sent at the anchor point, the slave unit 110 will receive this (provided the units 100, 110 are within range). The ID packet comprises the DAC of the slave unit 110 which is to be reconnected to the master unit 100. The frequency may be selected from the slave unit's page hopping sequence f(k), where k is the current clock of the master.

However, due to drift, the timing of ID transmissions, i.e. transmissions of an at least one ID packet, sent by the master unit 100 and that of the scan window in the slave unit 110 will drift; after 750 µs/2 y (ignoring the second ID transmission) there will not be an overlap anymore. For y=20 ppm, this may happen already after 18 seconds. Therefore, in the recovery page state, the transmission window may need to be increased both before and after the anchor point, see FIG. 6.

Figure 6:
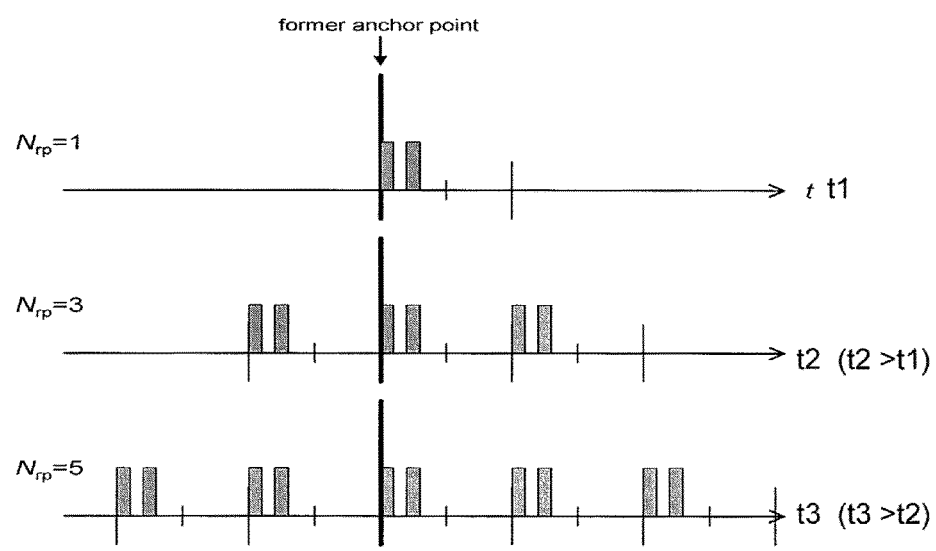
FIG. 6 illustrates how a number of ID packets can be gradually increased over time according to an embodiment of the invention.

The increase may be done gradually as time progresses as is illustratively shown in FIG. 6. It should be noted that FIG. 6 (as well as FIGS. 11, 12, and 18) only shows the transmissions (slots), not the receive slots. The person skilled in the art, however, readily appreciates that to each master-to-slave frequency and time slot, there is a corresponding slave-to-master frequency and time slot. This is however not shown in FIG. 6 (and FIGS. 11, 12, and 18). FIG. 6 illustrates an example of how the number $N_{rp}$ of master-to-slave slots, each comprising two ID packets, may be increased as time progresses. In this illustrative example, to ID packets (instead of only one) are used in order to be aligned with the conventional Bluetooth page procedure where two ID packets per master-to-slave slot are generally used. However, in the conventional Bluetooth page, the ID packets are sent on different frequencies whereas in the herein suggested fast recovery page procedure, the ID packets are sent on the same frequency.

Figure 7:
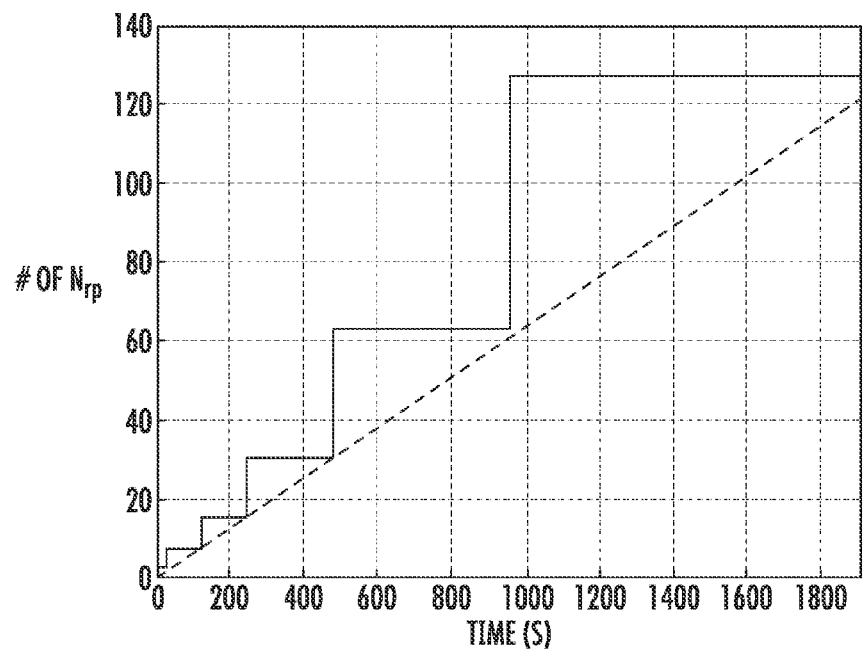
FIG. 7 illustrates an increase in the number Nrp of master-to-slave slots as time progresses.
Figure 8:
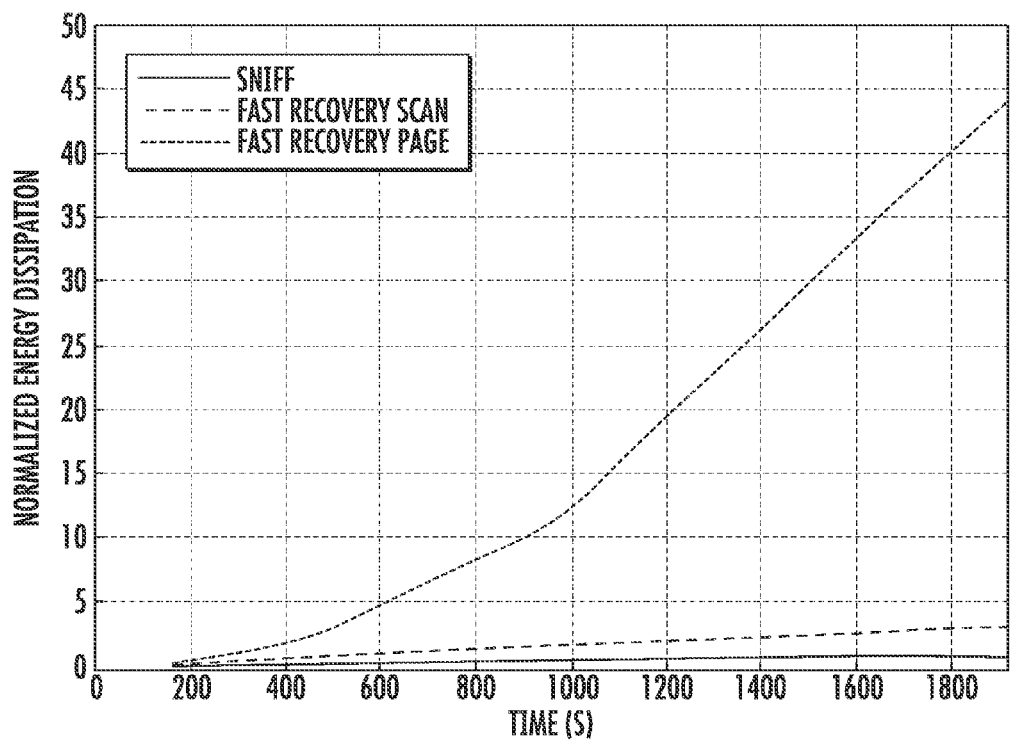
FIG. 8 illustrates an exemplary energy dissipation when time progresses for sniff, fast recovery scan, and fast recovery page (normalization towards sniff over 30 minutes) according to an embodiment.

FIG. 7 illustrates a possible increase of $N_{rp}$ over time. To simplify the implementation, seven discrete steps may be taken where the number of recovery page master-to-slave slots may be increased from 1 to 127. The solid line shows possible and suggested incremental steps (y=20 ppm assumed). As time progresses, the duty cycle of the recovery process in the former master unit 100 may increase from 0.04% for $N_{rp}$=1 to about 5% for $N_{rp\_max}$=127. In FIG. 8, the energy accumulated over time is shown for the different modes. The optimized sniff mode is taken as a reference ($E_{sniff}$=1 at t=30 minutes). The energy dissipation of fast recovery scan is close to that of sniff; the fast recovery page energy dissipation may increase faster due to the increase in duty cycle.

3. Latency in Fast Recovery

The latency in the fast recovery procedure may preferably, but not necessarily, be determined only by the scan interval. When the units are in range and no errors occur, the maximum response time may be 1.28 s. If a uniform distribution of the scan timing once the units come into range is in, the average latency may be 640 ms.

4. Compatibility with Bluetooth Page

It may be the case that after link loss but before the slow recovery begins, one of the units 100, 110 is reset and enters the disconnected mode. For example, the master unit 100 may be reset while the slave unit 110 is still in slow recovery state. The master unit 100 would then not be able to link to the slave 110. This may be solved in two different ways. In a first variant, a special page can be constructed which is similar to the original, standardized, Bluetooth paging method with A and B trains. A difference is in the repetition time of the A and B trains. In the standardized method, the use of A and B trains is alternated every 1.28 s. The slave unit 110 in recovery scan will miss its frequency always when it is misaligned and its scanning frequency is not in the batch with overlapping frequencies (this is because the scan window is smaller than 10 ms, the time needed to cover all 16 frequencies of a conventional page train). However, since the slave unit 110 in recovery scan has exactly the same periodicity of 1.28 s, it will continuously miss the proper frequency. To compensate for this, the special page from the master unit 100 (during the fast recovery mode when it cannot do a page recovery as discussed above) is configured to have a slightly different periodicity such that the slave unit 110 scanning is going to time slide through the A and B trains of the standard Bluetooth page. Accordingly, the period of alternation between A and B trains may change from 1.28 s to 1.28±dt where dt is dependent on the scan window length used by the slave in recovery scan. This scheme will also work even if the slave unit 110 had left the slave recovery mode and entered the standby state. A second variant involves using a 11.25 ms scan window for the slave recovery process. This may be identical to the original Bluetooth page. The slave unit can then be accessed both via the standard Bluetooth page and via the new recovery page. This may have some impact on the way the page recovery scheme will select the position of additional Nrp retransmissions and the time schedule when new retransmissions are added. Also the duty cycle of the slave unit in recovery mode will increase (from 0.1% to about 0.9%) whereas the duty cycle of the master recovery scheme can be reduced (it will probably never have to reach to 5% but may end at about 1.5%). The latter scheme is also described in more detail in the second embodiment hereinbelow.

5. Slow Recovery

It is possible to continue increasing the number Nrp of recovery page slots as time progresses even beyond $T_{FASTRECOVERY}$. $T_{FASTRECOVERY}$ may be set to e.g. 30 minutes. However, the duty cycle of the master unit will then potentially increase above 5% and may, hence, drain the battery for higher duty cycles. Therefore, when the fast recovery states have lasted for about $T_{FASTRECOVERY}$=30 minutes, the units 100, 110 may be adapted to enter a slow recovery state. In this state, the number of recovery slots $N_{rp}$ is frozen to 127 in this example; the master duty cycle therefore remains at a level of approximately below 5%. Since the time drifting still may take effect, the recovery scan state is adapted; not by increasing the scan window length, but by changing the scan repetition period such that a time sliding effect is enforced (but much faster than is caused by the drift from the clocks).

6. Slow Recovery Scan

Figure 9:
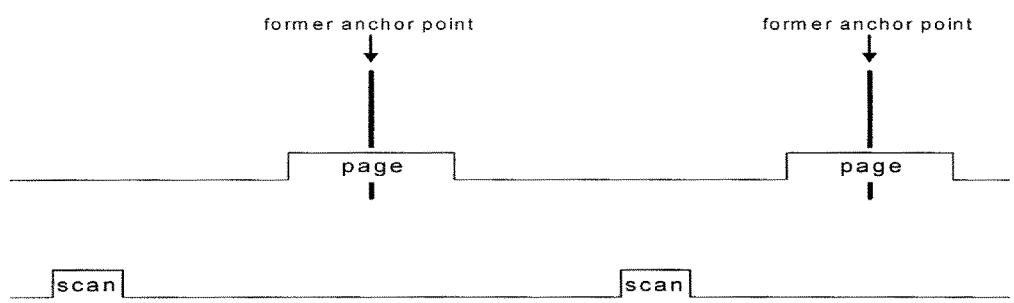
FIG. 9 illustrates timing misalignment between scan and page according to an embodiment of the invention.

When the units 100, 110 enter the slow recovery state, they both have a low duty cycle (about 5% for the recovery page and about 0.1% for the recovery scan). In a worst case situation, the recovery paging may occur just in between two scans as is shown in FIG. 9.

If the scan repetition period is increased from 1280 ms to 1280 ms+$\Delta T$, the scanning instances may start to slide with respect to the former anchor points. The maximum $\Delta T$ may be determined by the page window or:

$$\Delta T \leq N_{rp\_max} * 125 \text{ ms} = 127 * 1.25 \text{ ms} = 158.75 \text{ ms}$$

When in range and error-free conditions, the scanning window may overlap with the page window in maximally eight intervals or about 10 s. On average, it would then take 5 s before overlap occurs. If a smaller step $\Delta T$ is chosen, it may take longer before an overlap occurs. However, once an overlap occurs, there may be several overlap occasions in a row which increases the robustness.

Figure 10:
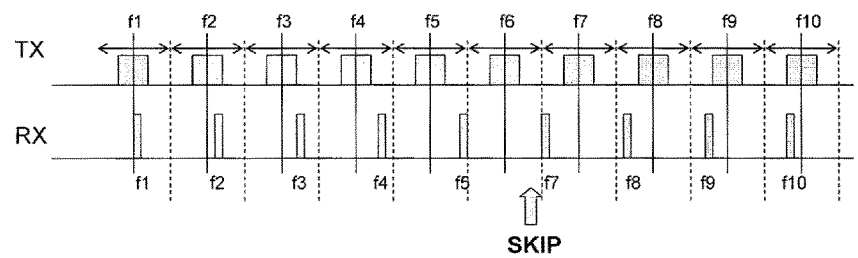
FIG. 10 illustrates that a scanning frequency may be skipped from the page hopping sequence according to an embodiment of the invention.

It may be important that for the selection of the scan frequency, the scanning device adheres to the former anchor points of the previous connection based on the master clock information. For the scanning frequency selection, an update may be made every 1280 ms e.g. right in between the two anchor points. This is shown in FIG. 10. Since the scan timing may slide through this frequency selection timing, periodically a frequency may be skipped from the page hopping sequence. In other words, in slow recover scan, the time sliding effect between the master unit 100 and the slave unit 110 may be increased by increasing the time interval between scans. This may introduce a forced drift of e.g. 12%. It may be generally important that this enforced drift is not applied on the frequency hop selection in the page hopping sequence. Otherwise, it may be possible to loose FH sync very quickly. The selection of hops shall be based on the former clock information of the link (and show only a drift of 40 ppm at maximum).

7. Slow Recovery Page

So far, it has been assumed that the paging in the slow recovery page state is identical to that in the last stage of the fast recovery page state. At instance k, two ID packets where sent at a fixed carrier frequency f(k) with a maximum repetition number of $N_{rp\_max}$=127. If it is desired to slow recovery to last beyond 4.5 hours (or for y values other than 20 ppm), FH synchronization may become an issue. This may be solved by increasing the number of carrier frequencies to three: f(k−1), f(k), and f(k+1). With the slow recovery covering the three frequencies, FH synchronization can be guaranteed up to 13 hours (assuming a worst-case drift of 40 ppm).

Figure 11:
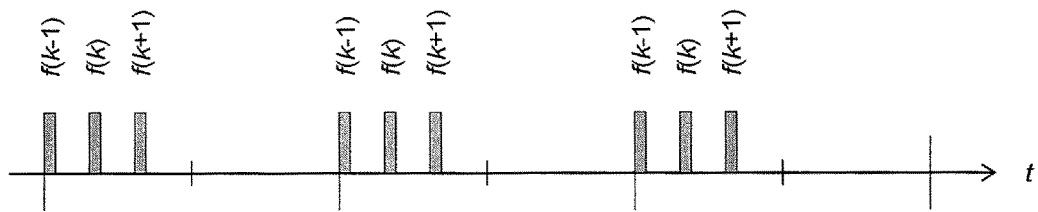
FIG. 11 illustrates three ID packets in one master-to-slave slot.
Figure 12:
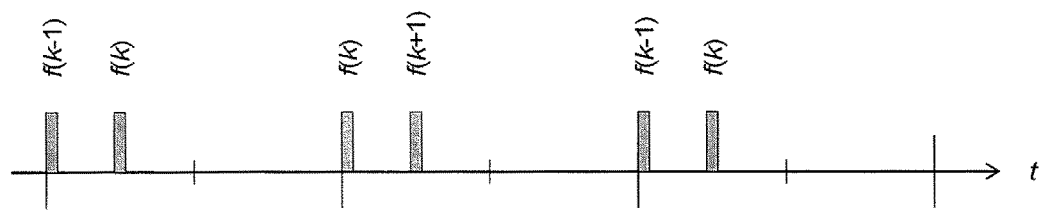
FIG. 12 illustrates two ID packets per master-to-slave slot, where three frequencies are distributed over two master-to-slave slots.

Sending on three frequencies can be done in two different ways, see FIG. 11 and FIG. 12, respectively. In FIG. 11, the timing is different from the Bluetooth page timing. Instead of two ID packets, three ID packets are sent. Since the ID packet length is 68 μs, there is 625/3−68 μs≈140 μs to switch the synthesizer. This is sufficient for modern fractional-N synthesizers (which need about 50 μs to switch frequencies). The duty cycle of the slow recovery page would, however, increase by 50%. The scheme depicted in FIG. 12 follows the Bluetooth timing more closely. However, the three frequencies cannot be caught in a single 1.5 ms scan window. The time sliding effect as discussed in the previous section is therefore important. It may now be required that if there is overlap at one instance, at the next instance there should also be overlap but now with two other frequencies. In the previous section, it has been shown that the increase $\Delta T$ in the scan repetition period should be at most $\Delta T_{max} N_{rp\_max} \cdot 1.25$ ms. It may now be required that the incremental increase $\Delta T$ is not a multiple of 2.5 ms:

$$\Delta T = n \times 2.5 \text{ ms} + 1.25 \text{ ms}$$

But since two overlaps in a row may be needed, there should be $\Delta T < \Delta T_{max}/2$.

8. Latency in Slow Recovery

Figures 13, 14:
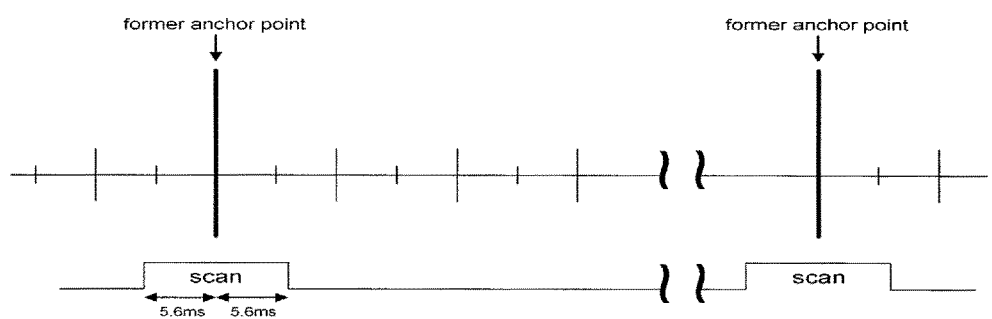
FIG. 13 is a table with latency values for different states.
FIG. 14 illustrates a timing diagram of a fast recovery scan window according to another embodiment of the invention.

Using a scan repetition, which is compatible with both the slow recovery page schemes (shown in FIG. 11 and FIG. 12) and with normal Bluetooth page, the latency can now be determined for the different cases. For the 3-ID packet scheme of FIG. 11, the maximum latency may be about 56 s. It may be necessary with 42 steps to slide through the sleep period of 1.28 s−$N_{rp\_max}$*1.25 ms between two slow recovery page instances. Thereafter, it may be necessary with up to two steps to slide through the 1.25 ms window containing the three frequencies. This leads to 44*1.28 s=56 s. For the two times 2-ID packet scheme of FIG. 12, it may again be necessary with 42 steps to slide through the sleep period. Thereafter, it may be necessary with up to four steps to slide through the 2.5 ms window containing the three frequencies. This leads to 46*1.28 s 59 s. Finally, for the normal Bluetooth page, it may be necessary with 10 ms/1.25 ms=8 steps to slide through a 10 ms window. Since the steps for the same page train may be separated by 2.56 s, it may take maximally 8*2.56 s=21 s before there is an overlap. The table of FIG. 13 summarizes the maximum and average response times once the units are within range and no errors occur.

9. Compatibility with Bluetooth

Preferably, but not necessarily, the slave unit 110 in slow recovery scan state is also susceptible to normal Bluetooth paging. This can be accomplished by choosing a proper scan repetition interval. Normal Bluetooth paging applies page trains A and B. A single page train may comprise ID packets sent at 16 different frequencies during a 10 ms window. This page train A may be repeated for 1.28 s after which a different page train B may be used for 1.28 s, etc. The 1.5 ms recovery scan window may be configured to slide properly through the trains. The separation between two scans on the same page train may now be nominally 2.56 s (page trains alternate with a 1.28 s period). Therefore, the scan repetition period should be:

$$\Delta T = m * 10 \text{ ms} + 0.625 \text{ ms}$$

where m is an integer

In the previous section, it was required that two consecutive scans would slide over a time length of 2.5 ms in total. The same coverage is also be obtained by four consecutive scans with a time stagger of:

$$\Delta T = n \times 2.5 \text{ ms} + 0.625 \text{ ms}$$

where n is an integer

Because of the reduced duty cycle in the slow recovery page state (as opposed to the 100% duty cycle during a Bluetooth page), in order to get overlaps in four consecutive instances, it may be needed that $\Delta T < \Delta T_{max}/4$.

The preferred slow recovery scan repetition period Tscan may be 5 obtained with n=12, which leads to m=3. The scan repetition period may then become:

$$T_{scan} = 1280 + 30 + 0.625 \text{ ms} = 1310.625 \text{ ms}$$

An alternative would be to use the original Bluetooth scan procedure. In that case, the slave unit could both be accessed by the standard Bluetooth paging, and by the new slow recovery page (which is the fast recovery page at maximum $N_{rp}$). For further details, the reader is referred to the second embodiment described hereinbelow.

B. Second Embodiment

During fast recovery, the time elapsed since the previous or last synchronization is still sufficiently small (a couple of minutes up to e.g. maximum 30 minutes) to be able to predict the timing in the both units 100, 110 (see FIG. 1). The former slave unit 110 (e.g. a headset or a watch) enters a recovery scan state; the former master unit 100 (e.g. a mobile phone) enters a recovery page state. Important to mention is that both these states are low duty cycle states (in contrast to the conventional page state in Bluetooth).

1. Fast Recovery Scan

When a loss of link 120 (see FIG. 1) has been detected, the former slave unit 110 enters the fast recovery scan state. The initial timing of the scan window may be based on the anchor point timing experienced during sniff. That is, the center of the scan window may be placed at the former anchor point, see FIG. 14 which illustrates a timing diagram of the fast recovery scan window. The scan window may have a length of about 11.25 ms, i.e. identical to the scan window in a conventional Bluetooth page scan. The scan repetition period may be 1.28 s. This results in a duty cycle of 0.9%. The hop frequency used may be selected from the 32 carrier page hopping sequence corresponding to the BD-ADDR of the slave unit 110. For each scan, a new hop carrier may be selected. The clock value k that is applied may be based on the former master clock as used when in sniff mode.

During scan, the slave unit 110 may correlate the incoming signals against a known 68-bit access code related to the BD-ADDR of the slave unit 110. This is an ID packet corresponding to the Device Access Code (DAC) also used in conventional page scan. When the correlator output exceeds a threshold, the slave unit 110 may be configured to enter a recovery response sub-state which may be identical to the Bluetooth page response sub-state. The slave unit 110 may be configured to return an identical ID packet at the proper timing and await the reception of a FHS packet. The FHS packet may then re-synchronize the timing and frequency hopping of the slave unit 110. The slave unit 110 may remain in recovery scan until the link 120 is re-established or when a timeout $T_{FASTRECOVERY}$ has exceeded indicating the end of the fast recovery state. Assuming a worst case mutual drift of 40 ppm, the timeout $T_{FASTRECOVERY}$ may, preferably, be set to about 30 minutes. It should be appreciated that the fast recovery scan is similar to the conventional Bluetooth page scan. A difference is, however, in the clock used for determining the hop frequencies and wake up timing. In the conventional scheme, it is the native clock of the slave unit 110 that sets the timing; in the fast recovery procedure disclosed herein, it is the slave unit's estimate of the master clock that sets the timing.

2. Fast Recovery Page

When a loss of link 120 has been detected, the former master unit 100 enters the fast recovery page state. The initial timing of the fast recovery page may be based on the anchor point timing experienced during sniff mode. If an ID packet is sent at the anchor point, the slave unit 110 will receive this (provided the units 100, 110 are within range). The ID packet comprises the DAC of the slave unit 110 which is to be reconnected to the master unit 100. The frequency may be selected from the slave unit's page hopping sequence f(k), where k is the current clock of the master.

Figure 15:
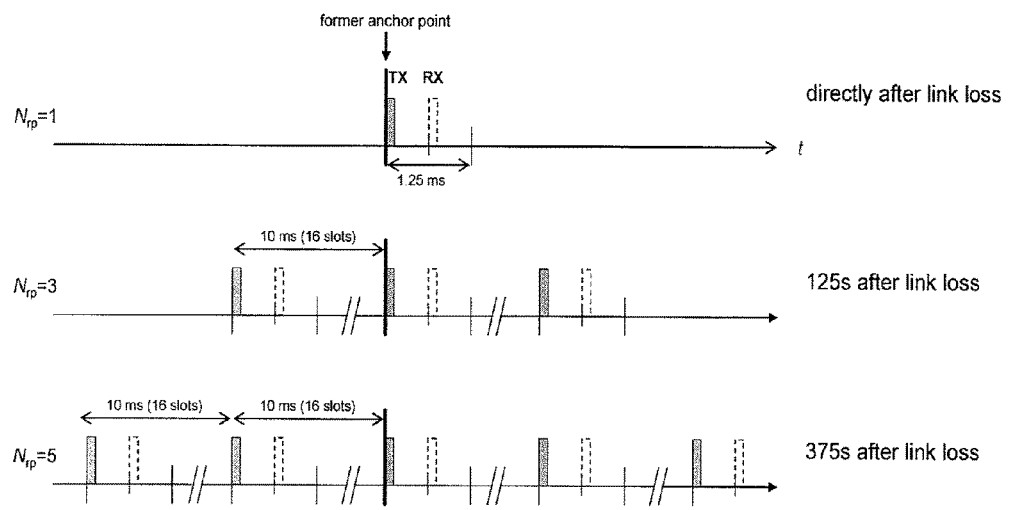
FIG. 15 illustrates how a number of ID packets can be gradually increased over time according to the embodiment of the invention shown in FIG. 14.

However, due to drift, the timing of ID transmissions, i.e. transmissions of at least one ID packet, sent by the master unit 100, and that of the scan window in the slave unit 110 will drift; after 5.6 ms/2 y there will not be an overlap anymore. For y=20 ppm, this may happen after e.g. 140 seconds. Therefore, in the recovery page state, the transmission window may need to be increased both before and after the anchor point, see FIG. 15. Since the scan window spans 11.25 ms in this embodiment, the separation between consecutive ID packets may need to be smaller than 11.25 ms. In order to adhere to the Bluetooth slot timing, a 10 ms separation may advantageously be used. The increase may be done gradually as time progresses as is illustratively shown in FIG. 15. FIG. 15 shows an example how the number $N_{rp}$ of master-to-slave slots, each comprising a one ID packet, may be increased as time progresses. Note that FIG. 15 (in contrast to FIGS. 6, 11, 12, and 18) shows not only the transmissions (slots), but also the receive slots. In FIG. 15, the dashed lines represent the corresponding RX slots to receive a response from the scanning device, i.e. master unit 100.

Figure 16:
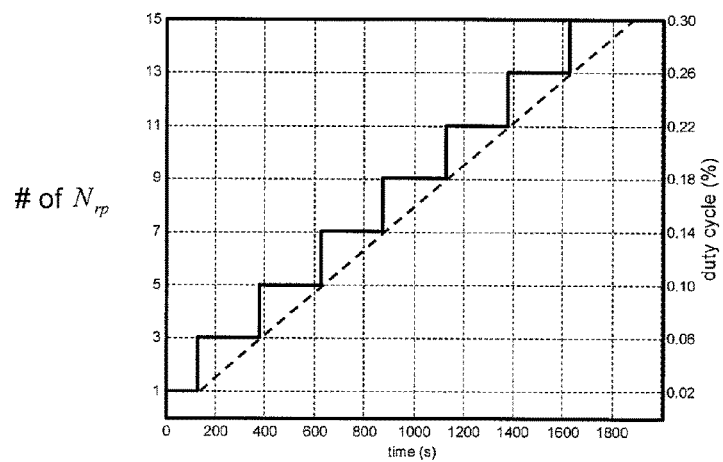
FIG. 16 illustrates an increase in the number $Ai_n$, of master-to-slave slots as time progresses.

FIG. 16 illustrates a possible increase of $N_r$p over time. The solid line shows 15 suggested incremental steps (y=20 ppm assumed). As time progresses, the duty cycle of the recovery process in the former master unit 100 may increase from 0.02% for $N_{rp}$=1 to about 0.3% for $N_{rp\_max}$=15 if it is assumed that the duty cycle is based on 50 µs synthesizer settling, 68 µs ID TX, 50 µs has synthesizer settling, 68 µs ID RX.

3. Compatibility Between Fast Recovery Scan and Bluetooth Page

Since the fast recovery scan state uses substantially the same parameters as the conventional Bluetooth page scan, a slave unit 110 in fast recovery scan could always be connected via the conventional Bluetooth page procedure.

4. Latency in Fast Recovery

It should be appreciated that the latency in the fast recovery procedure is only determined by the scan interval. When the units 100, 110 are in range and no errors occur, the maximum response time is 1.28 s. The average latency will be 640 ms, if a uniform distribution of the scan timing once the units come into range is assumed.

5. Slow Recovery

It is possible to continue increasing the number Nrp of recovery page slots as time progresses even beyond $N_{rp\_max}$=15. However, the duty cycle of the master unit will then potentially increase above 0.3% and may, hence, drain the battery for higher duty cycles. Therefore when the fast recovery states have lasted for $T_{FASTRECOVERY}$=30 minutes, the units 100, 110 are adapted to enter a slow recovery state. In this state, the number of recovery slots Nrp is frozen to 15 in this example; the master duty cycle therefore remains at a level of approximately below 0.3%. Since the time drifting still may take effect, the recovery scan state is adapted; not by increasing the scan window length, but by changing the scan repetition period such that a time sliding effect is enforced (but much faster than is caused by the drift from the clocks).

6. Slow Recovery Scan

Figure 17:
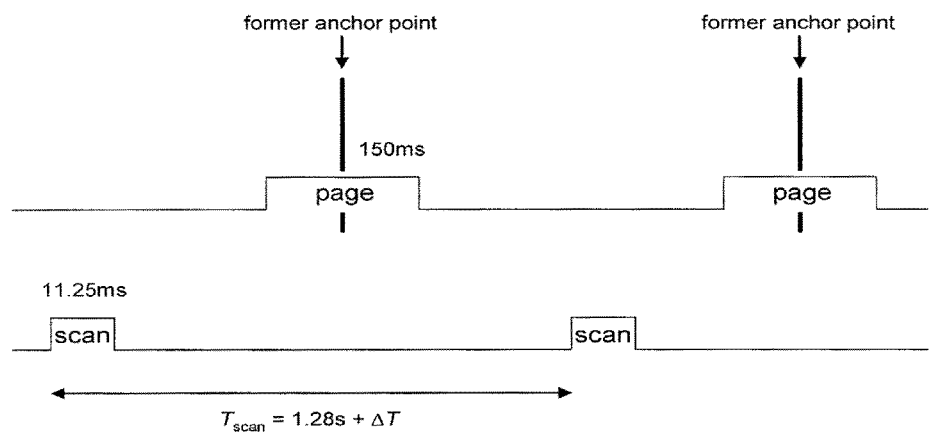
FIG. 17 illustrates timing misalignment between scan and page according to this embodiment of the invention.

When the units 100, 110 enter the slow recovery state, they both have a low duty cycle (about 0.3% for the recovery page and 0.9% for the recovery scan). In a worst case situation, the recovery paging may occur just in between two scans as is shown in FIG. 17.

If the scan repetition period is increased from 1280 ms to 1280 ms+ΔT, the scanning instances may start to slide with respect to the former anchor points. The 20 maximum ΔT may be determined by the page window or:

$$\Delta T \leq Nrp\_max * 10 \text{ ms} = 15 * 10 \text{ ms} = 150 \text{ ms}$$

It should be noted that this sliding corresponds to a mutual drift of about 17% which is much larger than the mutual clock drift of several tens of ppm. Whether this clock drift is positive or negative may therefore be immaterial.

It should be noted that the selection of the scanning frequencies may still be based on the former anchor points and may be updated every 1280 ms (which is, however, not necessarily identical to every new scan event). Because of the time sliding of the scanning window with respect to the former anchor points, once in a while a scanning frequency in page hopping sequence may be skipped.

When in range and error-free conditions, the scanning window may overlap with the page window in maximally eight intervals or about 10 s. On average, it would then take 5 s before overlap occurs. If a smaller step $\Delta T$ is chosen, it may take longer before an overlap occurs. However, once an overlap occurs, there may be several overlap occasions in a row which increases the robustness.

7. Slow Recovery Page

So far, it has been assumed that the paging in the slow recovery page state is identical to that in the last stage of the fast recovery page state. At instant k, at least one ID packet is sent at a fixed carrier frequency f(k) with a maximum repetition number of $N_{rp\_max}=15$. If it is desired to slow recovery to last beyond 4.5 hours (or for y values other than 20 ppm), FH synchronization may become an issue. This may be solved by increasing the number of carrier frequencies to three: f(k−1), f(k), and f(k+1). With the slow recovery covering the three frequencies, FH synchronization can be guaranteed up to 13 hours (assuming a worst-case drift of ±40 ppm).

Figure 18:
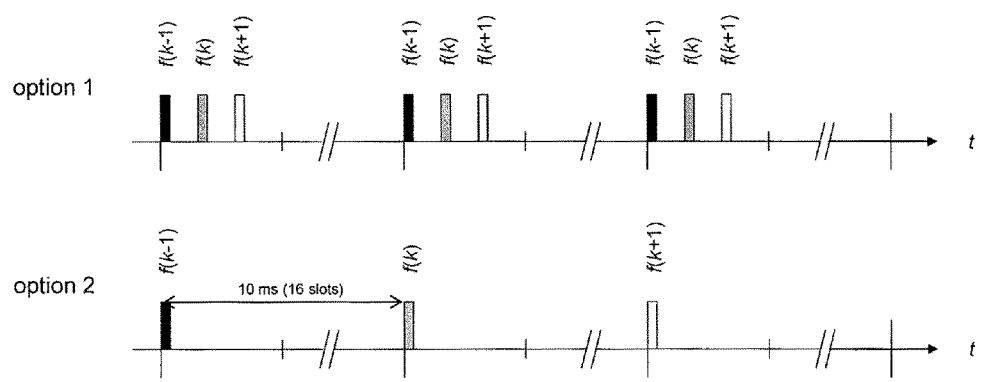
FIG. 18 illustrates two options for increasing the frequency span of a master unit, either three ID packets in one master-to-slave slot or three ID packets distributed over three master-to slave slots.

Sending on three frequencies may be done in two different ways, see FIG. 18. In option 1, three ID packets per 625 μs slot are sent. Since the ID packet length is 68 μs, there is 625/3 μs−68 μs=140 μs to switch the synthesizer. This is sufficient for modern fractional-N synthesizers (which need about 50 μs has to switch frequencies). The duty cycle of the slow recovery page would, however, increase by a factor of 3. Option 2 may follow the Bluetooth timing somewhat more closely. However, the three frequencies may not be caught in a single 11.25 ms scan window. The time sliding effect as discussed above may solve this provided a proper $\Delta T$ is applied.

Figures 19, 20:
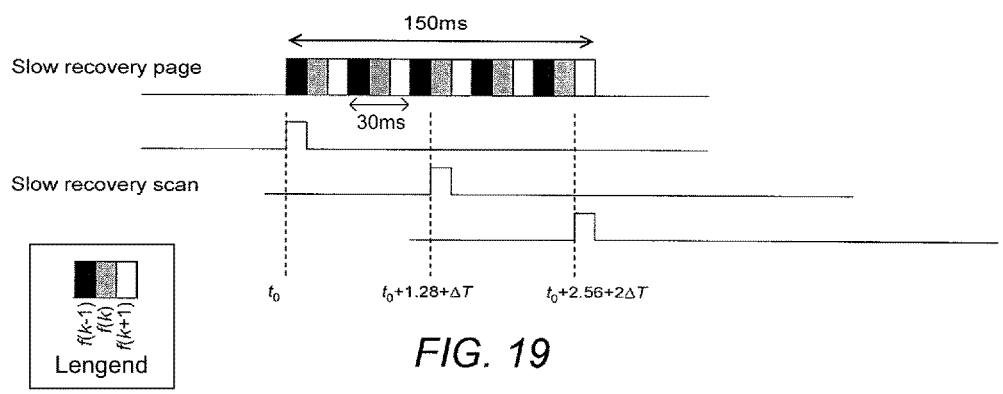
FIG. 19 shows required scan intervals in case of the slow recover page option 2 illustrated in FIG. 18.
FIG. 20 is a table with latency values for options 1 and 2 shown in FIG. 18 as well as a Bluetooth page.

For option 1, a single scan window of 11.25 ms may cover 3 frequencies. In that case, the initial interval increases of $\Delta T=150$ ms may be kept. If option 2 is applied, a single scan window only covers a single frequency. Three scans are required to cover 3 frequencies, see FIG. 19. The timing offset $\Delta T$ may preferably be an integer number times 10 ms, but no integer multiple of 30 ms (since that would equal the repetition of the triple frequencies in the slow recovery page). FIG. 19 shows that a maximum of $\Delta T=70$ ms may advantageously be used in case of option 2. Smaller $\Delta T$ values (but excluding 30 ms and 60 ms) can also be applied. This may improve the robustness at the expense of increasing the latency.

1. Compatibility with Bluetooth Page

Preferably, the slave unit 110 in slow recovery scan state should also be susceptible to normal Bluetooth paging. This may be automatically guaranteed if $\Delta T$ is an integer multiple of 10 ms. In that case, the scan window will slide over the conventional Bluetooth page trains.

1. Latency in Slow Recovery

Using a scan repetition period which is compatible with both the slow recovery page schemes (shown in FIGS. 17 and 18) and with the normal Bluetooth page, the latency may now be determined for the different cases. For the 3-ID packet scheme of option 1 and $\Delta T=150$ ms, the maximum latency may be about 10 s. Maximally 8 steps may be needed to slide through the sleep period of 1.28 s−$N_{rp\_max}$*10 ms. For the three times one-ID packet scheme of option 2 and $\Delta T=70$ ms, 17 steps may be needed to slide through the sleep period. Thereafter, up to two additional steps to slide through the 30 ms window containing the three frequencies may be needed. This leads to 19*1.28 s or 24 s. Finally, for the normal Bluetooth page, there may be similar results as in the conventional page scan mode. FIG. 20 shows as table, which summarizes the maximum and average response times once the units 100, 110 are within range and no errors occur.

In this disclosure, some embodiments have been described which may allow for improvements to the current Bluetooth sniff mode. A recovery procedure has been defined in order to improve the user experience of Bluetooth enabled units 100, 110 considerably. If the link is lost during Bluetooth sniff mode, the units 100, 110 may try to reconnect automatically using a low duty cycle recovery procedure. The recovery procedure may reuse the page frequency hopping sequence and the DAC ID packets as used in the conventional Bluetooth page procedure. A fast recovery may reconnect the two units 100, 110 within an average delay of about 640 ms when they are brought into range again. The fast recovery state may last for about 30 minutes (assuming a worst-case mutual drift of 40 ppm). During fast recovery, the duty cycle of the former slave unit 110 may be increased to 0.9%, the same as for a conventional page scan. The slave unit 110 may apply conventional page scan techniques (same page hopping scheme, same page scan window of 11.25 ms) but may, instead, use the clock information of the former master unit 100. In fast recovery scan state, the slave unit 110 may also be susceptible to conventional page messages using the standard Bluetooth page procedure. The duty cycle of the former master unit may increase over the 30 minutes window starting at 0.02% and rising to 0.3% at maximum. The master unit 100 may send ID packets including the slave's DAC. As time passes, the master unit 100 intensifies the repetition of ID transmissions. If no reconnection happens within e.g. 30 minutes, the units enter a slow recovery state. The duty cycle of the former master unit 100 is not further increased but remains at 0.3%. The duty cycle of the slave unit may remain at 0.9%; however, the scan period of the slave unit 110 may be increased to force a time sliding effect with the master recovery page transmissions. This may result in a longer delay when the units 100, 110 are within range (average delay in the order of 12 seconds) but will keep the units 100, 110 at low duty cycle. In slow recovery scan state, the slave unit 110 will also be susceptible to a conventional Bluetooth page messages. The slow recovery may carry on for more than 13 hours before FH synchronization is lost (again, assuming a worst-case mutual drift of 40 ppm). If the link has not been reconnected within this time, the units 100, 110 may return to conventional Bluetooth page scan (or turn off themselves, requiring a user action to start up again). In practical applications, the units would leave the slow recovery scheme much earlier (like 8 hours). The procedures described in this disclosure are quite general. However, if different clock accuracies are assumed, the final values will change. Larger inaccuracies will result in longer delays and/or larger duty cycles which translate into more power consumption.

II. Low-Power Radio System

As described in more depth herein, embodiments of the present invention relate to a Transmit Reference Spread Spectrum (TRSS) system which applies a frequency offset to separate the reference signal from the information signal. In contrast to conventional Direct Sequence Spread Spectrum (DSSS) systems where the spreading reference needs to be recreated in the receiver, in the TRSS system, the reference is embedded in the transmitted signal. Because the transmit signal contains the information and reference signals, acquisition and synchronization as required in DSSS systems are not necessary, and thus, the signal can be de-spread instantaneously irrespective of the processing gain. In conventional DSSS systems, a lengthy acquisition time is needed to synchronize the locally generated reference signal with the received signal, which also requires a larger processing gain. Moreover, in the TRSS system, the reference signal does not have to be extracted from the received signal, but de-spreading can be achieved directly by a mixing procedure as is later described. Finally, since the reference does not have to be recreated or extracted, the reference can be anything, including wideband noise. In these respects it is quite different from a pilot signal which could be embedded in a DSSS system.

Figure 21A:
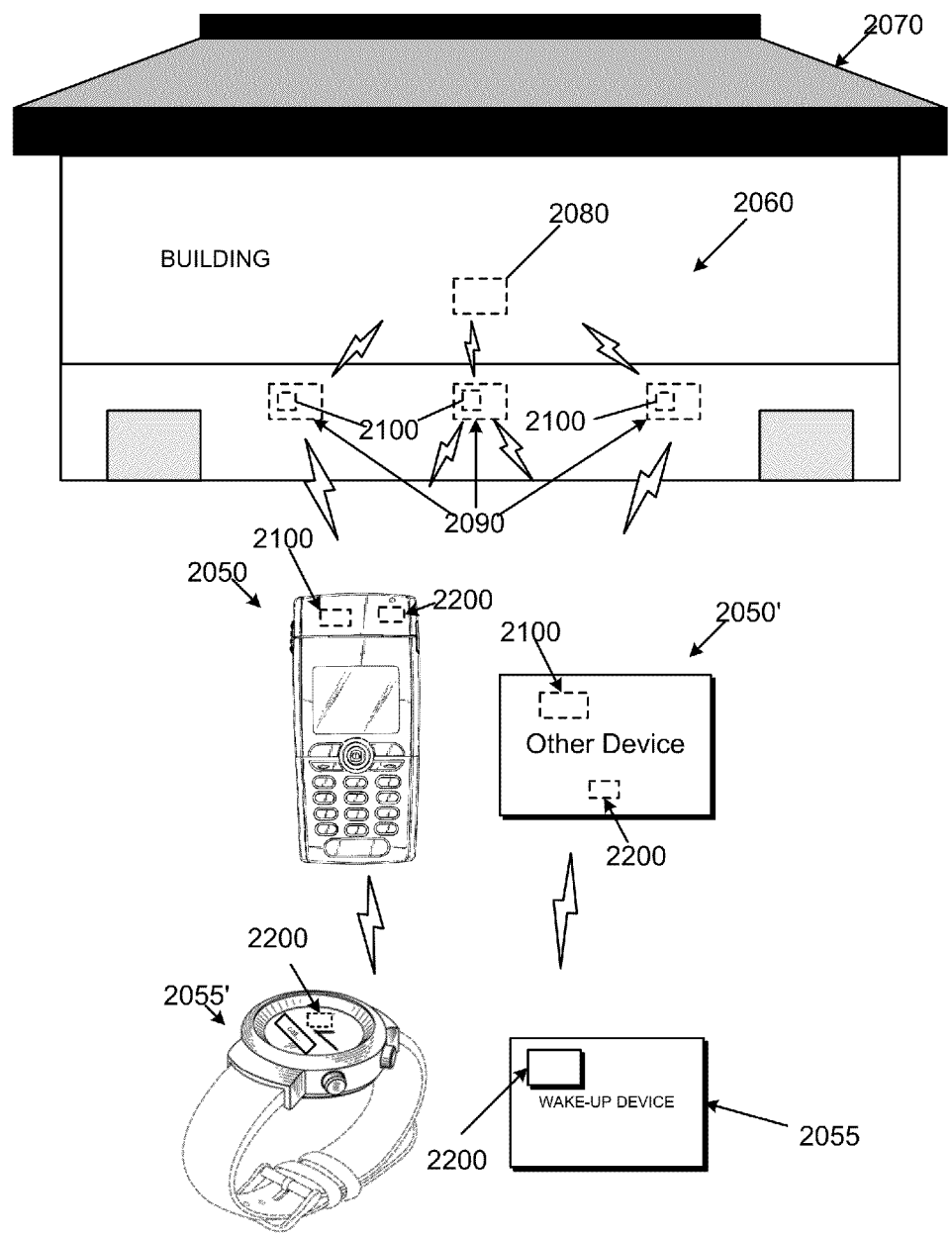
FIG. 21A is a system of exemplary devices having a transmit reference transmitter and other devices having a transmit reference receiver in accordance with one embodiment of the present invention.

The following Figures illustrate exemplary embodiments of TRSS systems, TRSS transmitters and TRSS receivers. FIG. 21A is a system of exemplary devices having a transmit reference transmitter and other devices having a transmit reference receiver in accordance with one embodiment of the present invention. A TRSS transmitter and/or receiver, in some embodiments of the present invention, may be incorporated into any mobile device 2050. Examples of such mobile devices 2050 may include a cellular telephone 2050, a watch 2055', a personal digital assistant (PDA), a cordless telephone, any portable computing device, a Bluetooth device, a laptop, any other electronic device 2050', and/or any other device. The phone 2050 could include a TRSS receiver 2200 so that it could be receiving TRSS signals from an indoor positioning system 2060 or other system. Typically, very low power devices like the watch 2055' would only incorporate a TRSS receiver 2200.

TRSS systems according to embodiments of the present invention may be used in uni-directional radio systems, including uni-directional short-range radio systems. One example of a uni-directional short-range radio system is a wake-up radio system 2055. A wake-up radio system includes a wake-up receiver 2200 and a transmitter 2100 communicable together via a wireless message. At reception of this message by the wake-up receiver 2200, which is transmitted by the transmitter 2100, the wake-up receiver 2200 will activate its host or other electronics associated with the wake-up receiver 2200. For example, referring back to FIG. 21A, an exemplary wake-up receiver is illustrated as embedded in a watch 2055' or other wake up device 2055. The cell phone 2050 would be able to wake up the watch 2055' or other wake-up device 2055 using its TRSS transmitter 2100. For each device to be woken up, a specific wake-up message is used which has a bit sequence unique for the unit to be woken up. Specifically, the watch 2055' would receive a transmit signal (discussed later) sent from the transmitter 2100 of the cell phone 2050 when an incoming call or other alert occurs. Upon receipt of such transmit signal, the receiver 2200 of the watch 2055' would activate (i.e., wake-up) at least a portion of the watch 2055' so that the watch 2055' could perform one or more actions, such as retrieve data from the transmit message, request data from the phone 2050, display that a call is incoming, display that a message (e.g., email message, MMS message, SMS message, etc.) has arrived, alert the user that a reminder has occurred, or perform other activities associated with other triggering events. All of this would occur based on a low power radio system (e.g., low power wake-up system). Because the low-power feature of this system, the wake-up radio system 2055 may be ideal for battery operated devices, such as a watch 2055' or other device.

Another example of a uni-directional short-range radio system is an indoor positioning estimation system 2060 where one or more beacons 2090 are spread out in a building 2070 and broadcast positioning transmit messages to a recipient, which may be the cell phone 2050, other mobile devices 2050', a controller 2080, or any other type of processing device. The beacons 2090 may include a transmitter 2100 of the present invention. The recipient (e.g., cell phone 2050') receives the positioning messages via a receiver 2200 of the present invention that may be embedded in the recipient. Based on these positioning messages, the recipient can determine the transmitter's location inside the building 2070. For example, after receipt of the beacon signal, the recipient may retrieve information from the transmitted signal which indicates the beacon position (e.g., maps of the building, location of beacons, closest beacon position, etc.) or any other data desired to be transmitted to the recipient. In one embodiment, the beacon 2090 may optionally, include a receiver of the present invention (not shown) so that the recipient can transmit a reply message to one or more beacons 2090 upon recipient of the broadcast of the positioning messages or other messages from the beacons 2090.

Other applications are also realized with the present invention and the wake-up system 2055 and indoor positioning systems 2060 are only meant to be two exemplary applications of the present invention.

It should be noted that the transmitter and receivers presented in FIG. 21A may employ any transmitter or receiver in accordance with any embodiment of the present invention, including the embodiments 2200, 2300, 2400, 2500 illustrated in FIGS. 22-25 or any other embodiments of the present invention. For example, the transmitter presented in the mobile devices 2055 and 2055' may be the transmitter 2300 as illustrated in the exemplary embodiment of FIG. 23 and the receiver illustrated in FIG. 21A may be the receiver 2400, 2500 presented in the embodiments shown in FIG. 24 or 25.

Figure 21B:
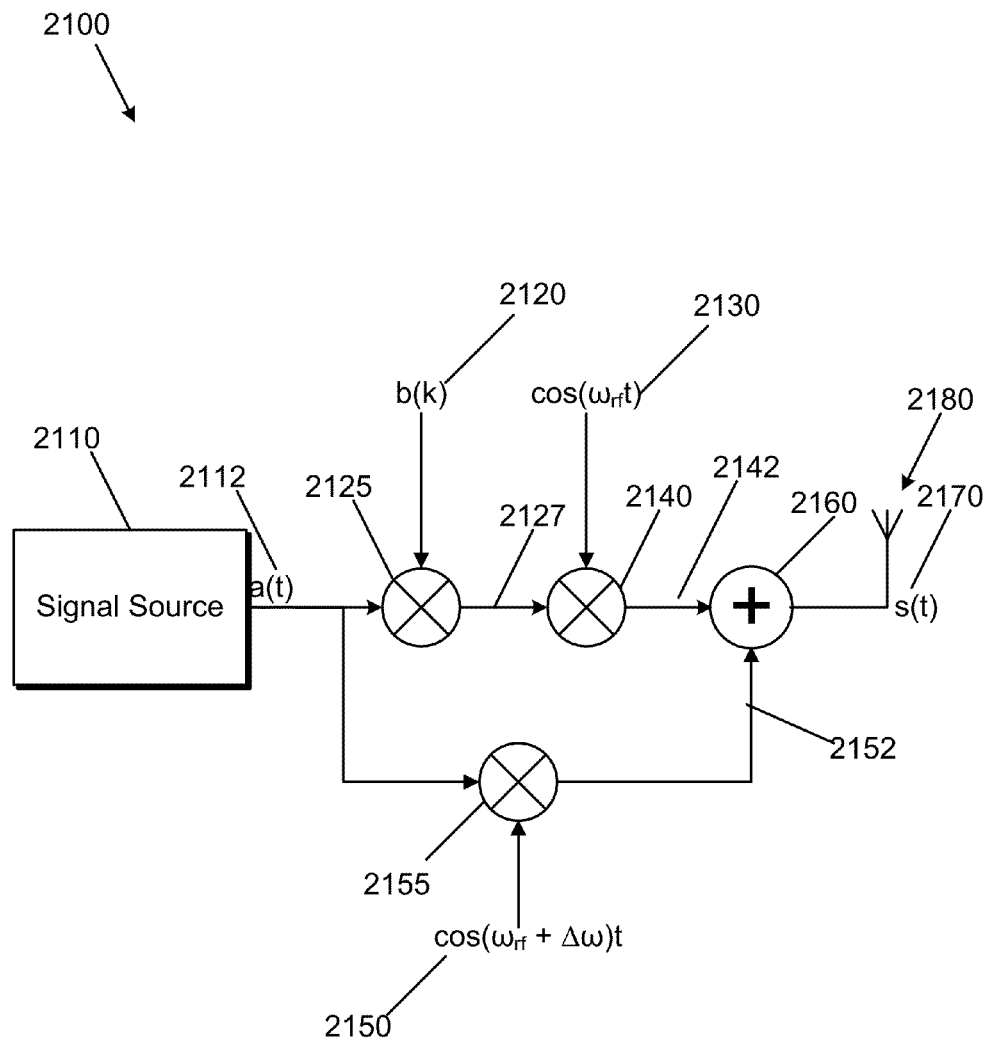
FIG. 21B is a block diagram of a transmit reference transmitter in accordance with one embodiment of the present invention.

FIG. 21B is a block diagram view of a TRSS transmitter 2100 in accordance with one exemplary embodiment of the present invention. The transmitter 2100 includes a signal source 2110 to generate a wideband reference signal, a(t), 2112. The reference signal 2112 may be any signal suitable for modulation by another signal. The reference signal 2112 may be generated at any frequency, such as a specific radio frequency (RF), and can be generated using any electronics, such as a RF voltage controller oscillator (VCO) with reasonable accuracy. It should be understood that the reference signal 2112 can be generated using any other electronics as the present invention is not limited to the reference signal generated by a RF VCO.

In one embodiment, the reference signal can be generated at baseband or intermediate frequency (IF) and then be up-converted to RF or other desired frequency. The bandwidth (e.g. RF band) of the reference signal 2112 can be any desired bandwidth. In one embodiment, the reference signal 2112 can be any RF band, such as any industrial, scientific and medical (ISM) band (e.g., 2.45 GHz). In another embodiment, the reference signal 2112 can be any lower band, such as the FM band from 88 to 101 MHz. It should be understood that the reference signal 112 can be any band of frequencies and the present invention is not limited to only an RF band or FM band.

The reference signal 2112 is modulated by the information-bearing data signal, b(k), 2120, at multiplier 2125, resulting in a first modulated signal 2127. This data signal b(k) can use any modulation scheme, such as BPSK, QPSK, 16-QAM, etc. The modulated signal 2127 is then multiplied with signal 130 (e.g., $\cos(\omega_{rf} t)$) by multiplier 2140 where $\omega_{rf}$ is the RF carrier frequency. Additionally, a frequency offset signal 2152 (e.g., $a(t)*\cos(\omega_{rf}+\Delta\omega)t$) is created by multiplying signal 2150 (e.g., $\cos(\omega_{rf}+\Delta\omega)t$) with reference signal a(t)

2112 by multiplier 2155, where Δω is the transmitted offset frequency. This resulting signal 2152 is then is combined with a signal 2142 (e.g., a(t)*b(k)*cos($\omega_{rf}$t)) by adder 2160, resulting in a transmit signal s(t) 2170. The transmit signal 2170 is represented by:

$$s(t) = b(k) \cdot a(t) \cdot \cos(\omega_{rf} t) + a(t) \cdot \cos(\omega_{rf} + \Delta\omega)t$$

where $\omega_{rf}$ is the RF carrier frequency and Δω is the offset frequency. Typically, the RF frequency $\omega_{rf}$ is in the order of 100 MHz to a few GHz, whereas the offset frequency Δω is in the order of a few kHz or MHz.

It is noted that the bandwidth $BW_a$ of the reference signal 2112 is much broader than the bandwidth $BW_b$ of the information-bearing data signal 2120 so that a spectrum spreading results. In one exemplary embodiment, the reference bandwidth $BW_a$ is some tens of MHz. Since the offset frequency is much smaller (e.g., in the order of 1 MHz or less), the spectra of the reference signal 2112 and combined data-reference signal almost completely overlap.

After the transmit signal s(t) 2170 is generated, the transmit signal s(t) 170 may then be transmitted through an antenna 2180 into surrounding space, which, in turn, may be received by a receiver 2200, which is discussed below with regards to FIG. 22.

Figure 22A:
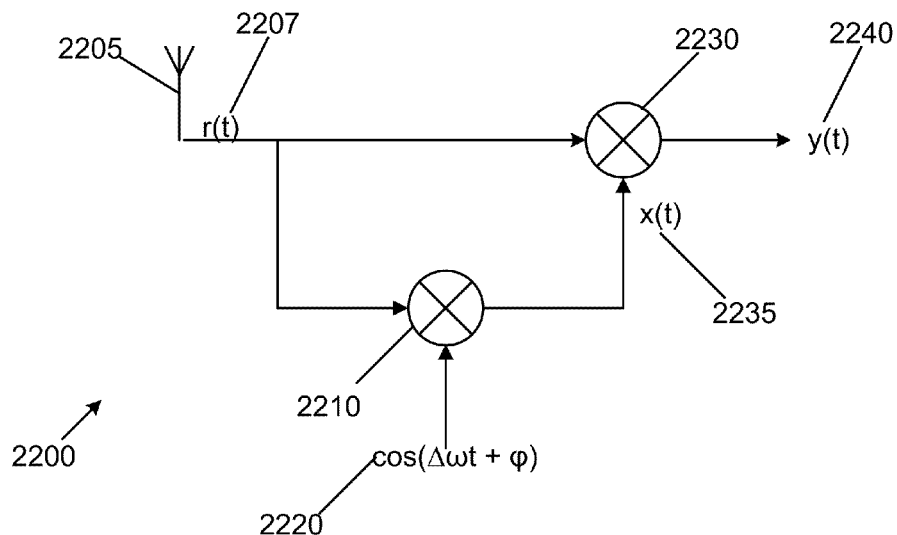
FIG. 22A is a block diagram of a transmit reference receiver in accordance with one embodiment of the present invention.
Figure 22B:
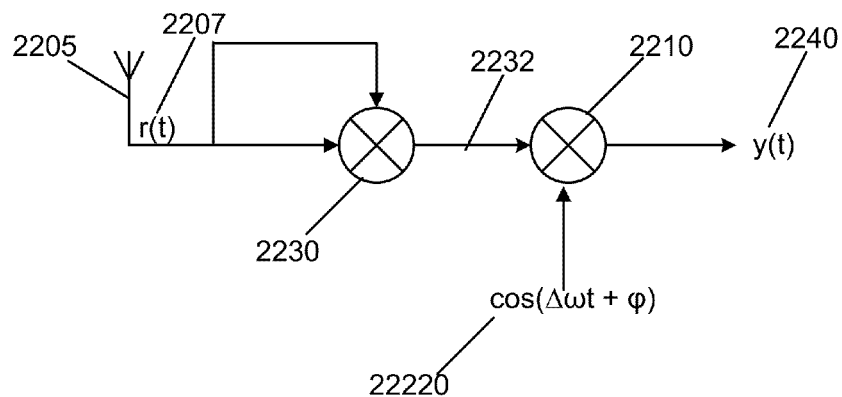
FIG. 22B is a block diagram view of a transmit reference receiver in accordance with another embodiment of the present invention.

FIGS. 22A-22B illustrate block diagrams of exemplary transmit reference receivers 2200, 2200' in accordance with some embodiments of the present invention. The receiver 2200, 2200' includes an antenna 2205, which receives the transmit signal s(t) 2170 from the transmitter 2100 after s(t) has traveled a certain distance.

Compared with the transmit signal s(t), the received signal r(t) at the receive antenna 2205 will likely be attenuated because of the radio propagation. Furthermore, the transmit signal may be distorted due to multipath phenomena encountered on the radio propagation path. The received signal (or "received transmitted signal"), as referred to herein, relates to the propagated transmit signal, which may have been distorted.

In the receiver 2200, 2200', the received signal (r(t)) 2207 proceeds to at least two multipliers, 2210 and 2230, for de-spreading and, optionally, demodulation. The exact location and configuration of these multipliers can be variable. For example, FIG. 22A illustrates one configuration of the receiver 2200: at multiplier 2210, the received transmit signal r(t) 2207 is multiplied by frequency offset signal 2220 (e.g., cos(Δωt+φ)) resulting in a frequency-shifted signal (x(t)) 2235. This frequency-shifted signal x(t) 2235 is represented by:

$$x(t) = r(t) \cdot \cos(\Delta\omega t + \phi) = \{b(k)a(t) \cdot \cos(\omega_{rf} t) + a(t) \cdot \cos(\omega_{rf} + \Delta\omega)t\} \cos(\Delta\omega t + \phi)$$

The frequency-shifted signal x(t) 2235 is multiplied with the received transmit signal r(t) 2207 by multiplier 2230 resulting in the de-spread signal (y(t)) 2240. It should be noted that de-spread signal 2240 (y(t)=r(t)² cos(Δωt+φ)) produced by the receiver 2200 is a square of the received signal (r(t)²) multiplied by the frequency offset signal 2220 (e.g., cos(Δωt+φ)).

FIG. 22B illustrates an alternate embodiment where the position of the multipliers 2210, 2230 may be different than that presented in FIG. 22A, but still result in the same de-spread signal 2240 ((y(t)=r(t)² cos(Δωt+φ)). As illustrated, multiplier 2230 may act as a squaring circuit first and then, the resulting signal 2232 (r(t)²) is multiplied by signal 2220 (e.g., cos(Δωt+φ)) by multiplier 2210. Again, this de-spread signal 2240 (y(t)=r(t)² cos(Δωt+φ)) is a square of the received signal (r(t)²) multiplied times the frequency offset signal 2220 (e.g., cos(Δωt+φ)). Thus, the demodulated signal 2240 is the same whether the receiver of FIG. 22A or 22B is used.

It should be further noted that the RF frequency ($\omega_{rf}$) does not occur in the receiver circuit, but instead, only the offset frequency (Δω). As such, there is no high-power RF local oscillator (LO) included or required in the receiver. Furthermore, the reference signal a(t) does not need to be regenerated in the receiver 2200, 2200' for de-spreading or demodulation of the received signal 2207.

If only squaring is applied, the desired de-spread information-bearing signal 2120 will be located at the offset frequency Δω and this signal can be retrieved at IF. This may be advantageous since greater gains at IF can be obtained. In addition, the unknown or variable phase φ does not need to be retrieved.

The receiver 2200, 2200' squares the received signal r(t) 2207. After squaring, the resulting signal 2232 is calculated as follows:

$$y(t) = [b(k) \cdot a(t) \cdot \cos(\omega_{rf} t) + a(t) \cdot \cos(\omega_{rf} + \Delta\omega)t]^2 = $$
$$b^2(k)a^2(t)\cos^2(\omega_{rf} t) + a^2(t)\cos^2(\omega_{rf} t + \Delta\omega t) + $$
$$2b(k)a^2(t)\left\{\frac{1}{2}\cos(\Delta\omega t) + \frac{1}{2}\cos(2\omega_{rf} t + \Delta\omega t)\right\} = $$
$$\frac{1}{2}b^2(k)a^2(t)\{1 - \cos(2\omega_{rf} t)\} + \frac{1}{2}a^2(t)\{1 - \cos(2\omega_{rf} t + 2\Delta\omega t)\} + $$
$$b(k)a^2(t)\{\cos(\Delta\omega t) + \cos(2\omega_{rf} t + \Delta\omega t)\}$$

As shown in the equation above, the resulting DC component at the carrier frequency is:

$$\frac{1}{2}\{b^2(k) \cdot a^2(t) + a^2(t)\}$$

and the component at the offset frequency (Δω) is b(k)·a²(t). Note that the signal component at the offset frequency (IF) is the information bearing signal including b(k). The signal at DC can be considered a self-interference signal. The components that are located at twice the RF carrier frequency (~2$\omega_{rf}$) may be ignored and thus, can be filtered away (or integrated and dumped) using a filter or like device.

To prevent inter-carrier interference (e.g. from the self-interference signal located at DC), the spectrum of the squared reference a²(t) should resemble a Dirac impulse. To accomplish this, the reference signal 2112 (a(t)) should produce a constant amplitude after squaring. This can be achieved by using a constant envelope function, e.g. a binary function. In one embodiment, if the reference signal 2112 (a(t)) and the information-bearing signal 2120 (b(k)) are binary signals (e.g., +1, −1), the resulting square will be a constant: a²=1, b²=1. In the frequency domain, the DC component $$\left(\frac{1}{2}\{b^2(k) \cdot a^2(t) + a^2(t)\}\right)$$

of the demodulated data signal 2232 is fixed, whereas the de-spread information-bearing signal 2120 (b(k)) (i.e. after de-spreading in the receiver) arises at the offset frequency Δω. This information-bearing signal is thus extracted from the transmitted signal 2170 without having to generate a reference signal or via the use of a high-frequency local oscillator. Nonetheless, since the squared reference signal at DC is a spike, there is no cross-interference between the information-bearing signal 2120 and the reference signal 2112. Subsequent mixing with the offset frequency $\Delta\omega$ will move the intermediate frequency (IF) portion of the signal to baseband where the information-bearing signal 2120 (b(k)) can be retrieved.

In one embodiment, the symbol rate of the de-spread information-bearing signal 2120 b(k) and the frequency offsets $\Delta\omega_i$ are based on 32 kHz (or other low frequency) which is also used for the real-time clock. The receiver then only needs a low power oscillator (LPO) with a 32 kHz reference from which all clocks in the receiver are derived. The low frequency of the oscillator allows for a low power oscillator to be employed and thus, the receiver becomes a low powered device. In one embodiment, the power of the low power oscillator allows for the peak power consumption of the receiver to be fully operated at 10-100 µW. Thus, applications, such as wake-up radios, do not need to be based on amplitude shift keying (ASK) or on-off keying, and can still apply spectrum spreading to obtain robustness in a multi-path fading and interference-prone environment.

Figure 23:
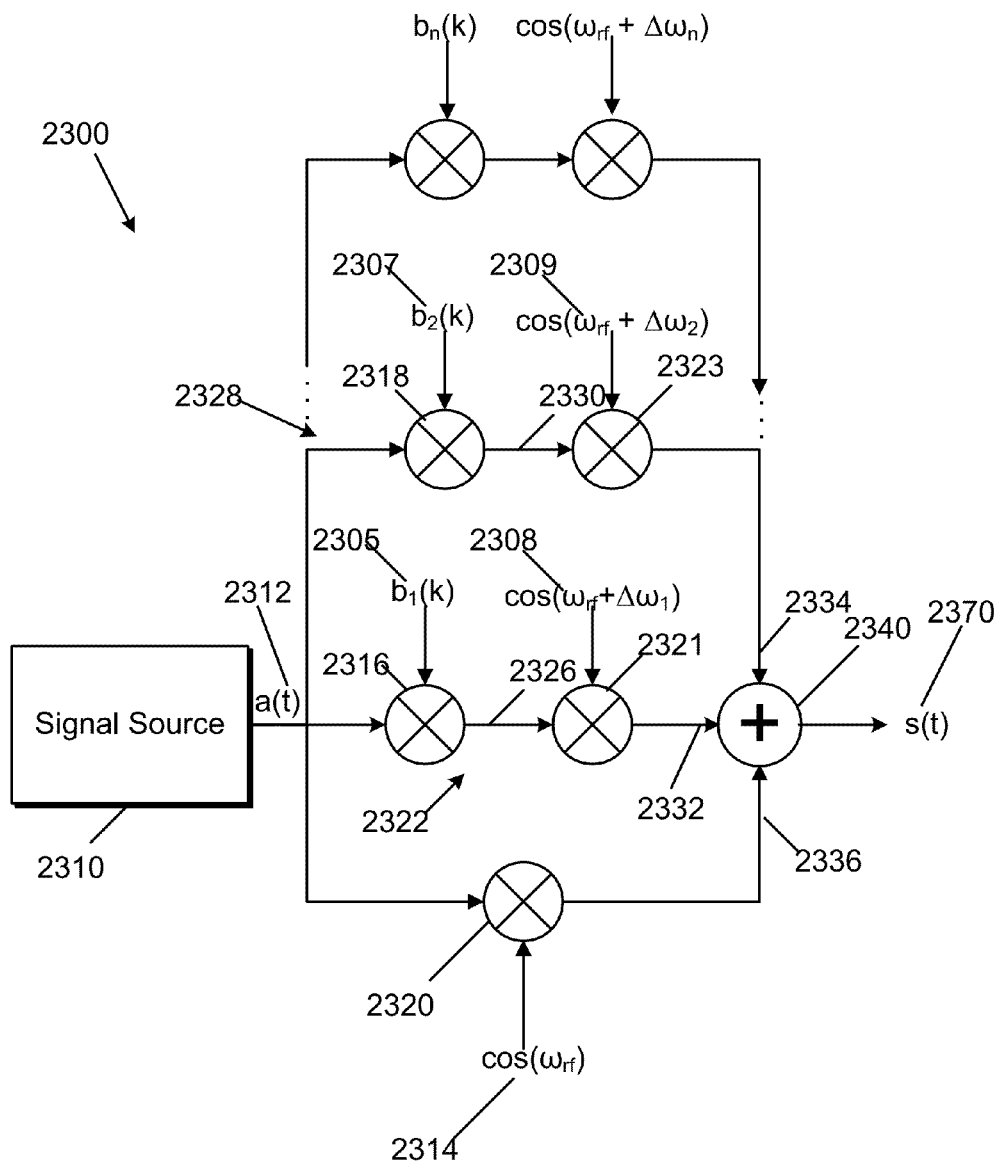
FIG. 23 is a block diagram of a transmit reference transmitter capable of transmitting a signal with multiple channels in accordance with an embodiment of the present invention.

FIGS. 21B, 22A and 22B illustrate a TRSS system with a single channel carrying a single information-bearing signal 2120 in the transmit signal 2170. However, it should be understood that multiple information-bearing channels can be embedded in the transmit signal 2170 by applying multiple data branches each with their own offset frequency $\Delta\omega_i$. FIG. 23 illustrates a block diagram view of an exemplary multiple channel transmit reference transmitter in accordance with an embodiment of the present invention.

It is noted that, in FIG. 23, the offset signals $\cos(\omega_{rf}+\Delta\omega_1)$ 2308 and $\cos(\omega_{rf}+\Delta\omega_2)$ 2309 are applied to the information-bearing signals 2305 and 2307 ($b_i(k)$) rather than to the reference signal 2312 (a(t)). It should be understood that the offset signals $\cos(\omega_{rf}+\Delta\omega_1)$ 2308 and $\cos(\omega_{rf}+\Delta\omega_2)$ 2309 may be applied to either the respective data signals $b_1(k)$ 2305, $b_2(k)$ 2307 or the reference signal a(t) 2312.

In determining the transmit signal s(t) 2370 for the multiple channel transmitter 2300, a signal source 2310 first generates the reference signal 2312.

The reference signal 2312 is then sent to multiple different multipliers 2320, 2316 and 2318. At multiplier 2320, the reference signal 2312 is multiplied by the carrier frequency signal ($\omega_{rf}$) 2314, resulting in a carrier reference signal 2336. At a first channel branch 2322, the reference signal 2312 is multiplied by a first information-bearing signal ($b_1(k)$) 2305 by a multiplier 2316 and the resulting signal 2326 is then multiplied by a first offset frequency signal ($\cos(\omega_{rf}+\Delta\omega_1)$) 2308 by multiplier 2321. At a second channel branch 2328, the reference signal 2312 is multiplied by a second information-bearing signal ($b_2(k)$) 2307 by multiplier 2318 and the resulting signal 2330 is then multiplied by a second offset frequency signal ($\cos(\omega_{rf}+\Delta\omega_2)$) 2309 by multiplier 2323. The modulation schemes for $b_1(k)$ and $b_2(k)$ may not necessarily be the same. For example, the modulation scheme for $b_1(k)$ may be BPSK while the modulation schemes for $b_2(k)$ may be QPSK. Nonetheless, the signals 2332 and 2334 resulting from each channel branch 2322 and 2328 are combined with the carrier reference signal 2336 by adder 2340 resulting in the transmit signal (s(t)) 2370. The transmit signal (s(t)) 2370 is thus:

$$s(t)=a(t)\cos(\omega_{rf}t)+b_1(k)\cdot a(t)\cdot\cos(\omega_{rf}+\Delta\omega_1)t+b_2(k)\cdot a(t)\cdot\cos(\omega_{rf}+\Delta\omega_2)t$$

This transmit signal 2370 is transmitted through an antenna of the transmitter 2300 into space.

The optimal signal-to-noise ratio (SNR) is obtained when $(\Delta\omega_i)=\pi n/T_b$ where $T_b$ is the symbol period of the data signal b(k) and n an integer (e.g., n=1, 2 for 2 channels).

Because of the non-linear, squaring operation of the received signal r(t), self-interference will arise due to the inter-modulation mixing of different components of r(t). To avoid inter-modulation products to end up in viable channels, combinations of additions and/or subtractions of the offset frequencies should not be equal to any of the offset frequencies themselves (i.e., $\Delta\omega_i\pm\Delta\omega_j\neq\Delta\omega_k$ where i, j, k=1, 2, 3, ... n for n parallel channels). This can, for example, be realized by selecting odd harmonics (e.g., 1 MHz, 3 MHz, 5 MHz ... 2 m+1 MHz) for the offset frequencies for the channels. After squaring, the inter-modulation products due to self-interference will then end up at even harmonics (e.g., 0 MHz, 2 MHz, 4 MHz, 6 MHz, ... 2 m MHz) which are not on any of the viable channels. Other combinations are possible that equally prevent inter-modulation.

As an example, a TRSS system operating in the FM broadcast spectrum (88-101 MHz) could have a RF center frequency of $\omega_{rf}$=98 MHz and a spreading bandwidth (BW) of 16 MHz. Assuming an information rate (R) of R=32 kb/s (based on the typical frequency of 32 kHz of a Real-Time clock), the offset frequencies could be chosen to be $\Delta\omega_1$=5R=160 kHz, $\Delta\omega_2$=8R=256 kHz, and $\Delta\omega_3$=11 R=352 kHz. Inter-modulation products due to self-interference as the square thereof will arrive at f=3R=96 kHz, f=6R=192 kHz, and f=10R=320 kHz, each of which is adjacent to the desired signals. Furthermore, inter-modulation products caused by strong FM broadcast signals may arrive at f=200 kHz, f=300 kHz, f=400 kHz, and so on. The latter is based on the fact that the FM channel spacing is 100 kHz with at least a minimum separation of 200 kHz between adjacent FM channels. Also these inter-modulation products will be outside the bands of interest.

As another example, a TRSS system operating in the 2.4 GHz ISM spectrum could have a RF center frequency of $\omega_{rf}$=2441 MHz and a spreading bandwidth of 80 MHz. Assuming the same information rate of R=32 kb/s, the same offset frequencies can be selected, as indicated in the above example. All radio standards operating in the 2.4 GHz ISM band have a channel grid and spacing of at least 1 MHz. The first inter-modulation product after squaring will be at 1 MHz which is well above the offset frequencies presented.

For a wake-up system or other systems, a single channel may suffice. The channel will send a specific bit sequence that will wake-up the receiver. Only if this specific bit sequence is received will the receiver wake-up its host. A pilot channel could be added to support the synchronization in the receiver. Note that this pilot will be generated at baseband and follows the same modulation and combination with offset carriers as the information-bearing signals. Preferably, the data stream $b_p(k)$ for the pilot uses a very simple modulation scheme like BPSK.

In one embodiment, the pilot channel is self-decoding. The pilot is obtained using the correct offset frequency between the reference and the pilot channel. As such, the pilot is obtained immediately and with minimal power. For example, to obtain the pilot, there is no need for a local oscillator at the RF frequency and the pilot does not need to be generated in the receiver.

In an indoor positioning system or other systems, multiple of channels could be added that provide different kinds of data. For example, we could have one pilot channel at $\Delta\omega_1$ which indicates that a beacon is present; a second channel at $\Delta\omega_2$ may carry positioning information; a third channel at $\Delta\omega_3$ may provide local maps that can be downloaded; and $\Delta\omega_n$ providing other information; and so on. A receiver for receiving multiple channels is shown in FIG. 24.

Figure 24:
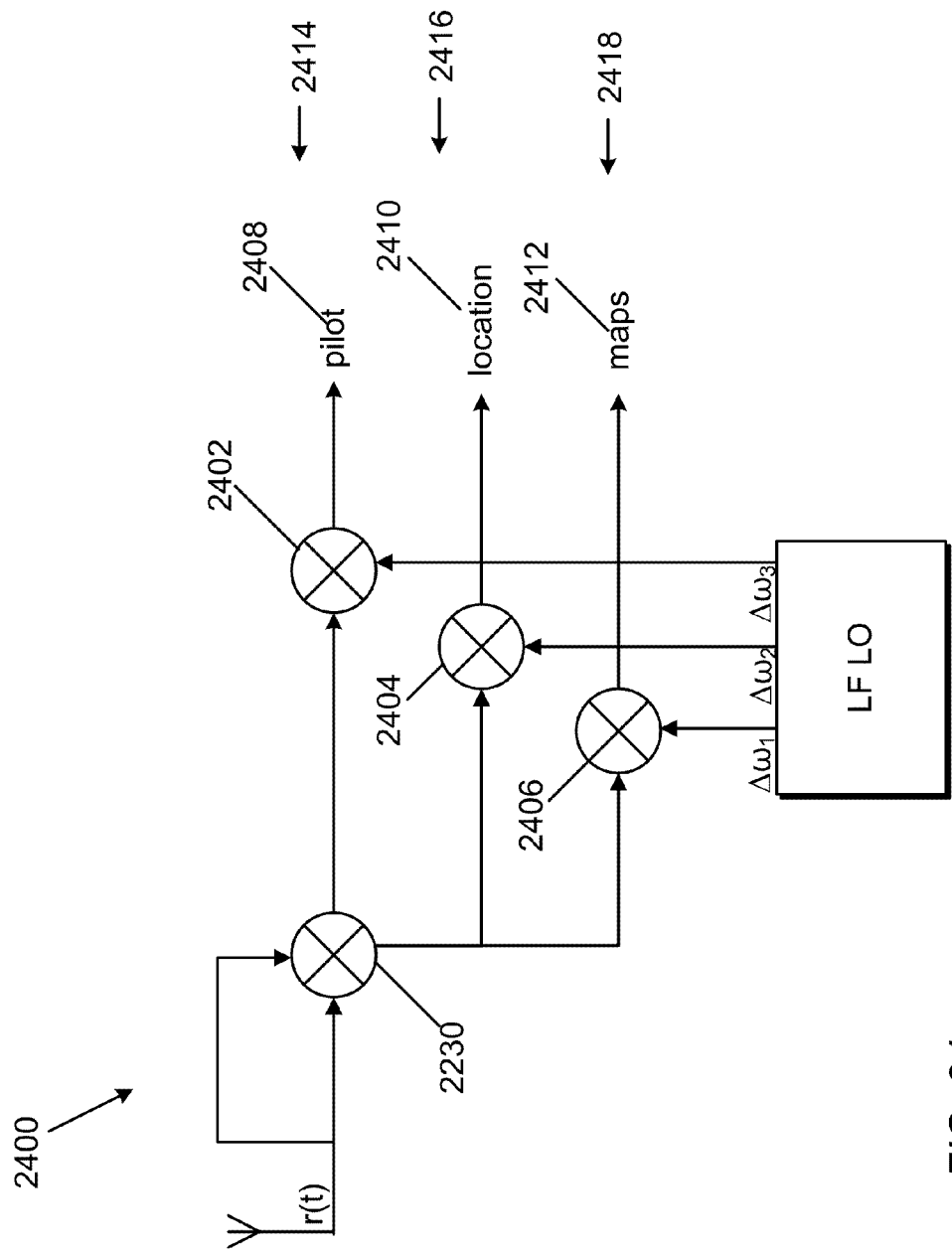
FIG. 24 is a block diagram of a transmit reference receiver capable of de-spreading a signal having multiple channels in accordance with an embodiment of the present invention.

FIG. 24 is a block diagram view of a multiple channel transmit reference receiver 2400 in accordance with an embodiment of the present invention. As illustrated in the exemplary embodiment, three mixers 2402, 2404, and 2406 provide the signal for pilot data 2408, location data 2410, and map data 2412, respectively, each of which are on different channels 2414, 2416, 2418.

One exemplary embodiment, however, may only contain a single mixer that can be tuned to each of the different offset frequencies $\Delta\omega_1$, $\Delta\omega_2$ and $\Delta\omega_3$ For example, first, the receiver would tune to $\Delta\omega_1$ to look for a pilot signal. Once found, the pilot signal can give important information for fine synchronization and timing. Then, the receiver would tune to the second offset frequency $\Delta\omega_2$ to retrieve its position signal. Only in case the proper maps are not already in the host may the receiver tune to $\Delta\omega_3$ to download one or more maps. Although three channels 2414, 2416, 2418 are illustrated in FIG. 24, any amount of channels may be employed in the transmitter 2300 and receiver 2400 as the present invention is not limited to any specific number of channels.

The pilot signal 2408 may carry a simple one-zero sequence. This sequence should be easy to detect and can be a presence indication of an indoor beacon or a wake-up signal. The pilot 2408 can also provide symbol and/or frame timing information to the receiver 2400. Once found, this information can then be used by the receiver 2400 to demodulate one or more channels 2416, 2418.

Further, the pilot signal 2408 can be used to obtain the proper phase and frequency of the offset frequency $\Delta\omega$ at the receiver 2400. At the transmitter 2300, an offset carrier of $\cos(\Delta\omega t)$ is applied. In the receiver 2400, a signal $\cos((\Delta\omega+\delta)t+\phi)$ can be recreated and for proper demodulation, $\delta=0$ and $\phi=0$. We could obtain this by applying an IQ mixer (i.e., multiplying the signal with $\cos((\Delta\omega+\delta)t+\phi)$ and $\sin((\Delta\omega+\delta)t+\phi)$ and perform frequency and phase tracking in the digital domain to compensate for $\delta$ and $\phi$.

Figure 25:
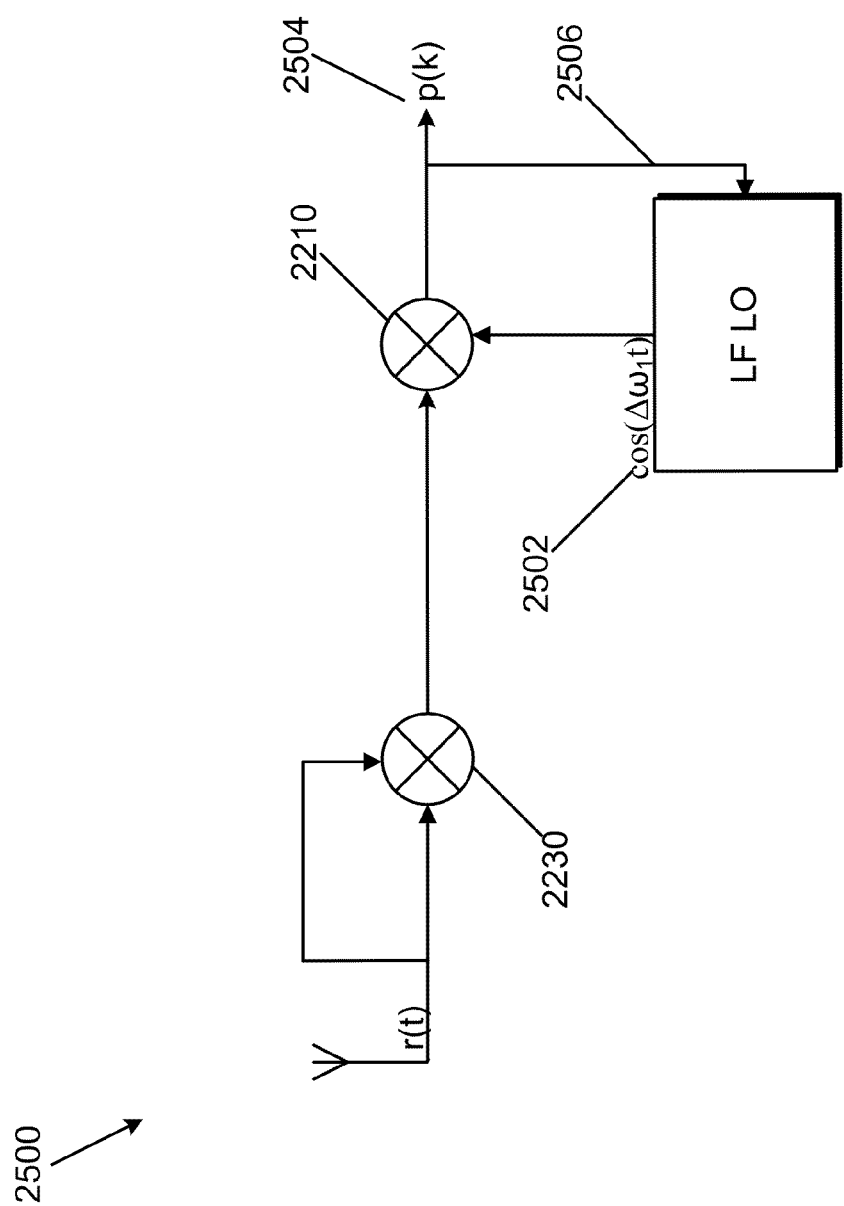
FIG. 25 is a block diagram of a transmit reference receiver in accordance with another embodiment of the present invention.

FIG. 25 is a block diagram view of a transmit reference receiver 2500 in accordance with yet another exemplary embodiment of the present invention. This receiver 2500 is another lower power solution that embeds the $\cos(\Delta\omega t)$ information 2502 in the pilot signal p(k) 2504. To accomplish this, the one-zero pattern in the pilot 2504 is phase and frequency synchronized to $\cos(\Delta\omega t)$ when created in the transmitter (not shown). The receiver 2500 can lock to the pilot signal 2504 (which may be AM modulated if $\delta \neq 0$) to retrieve a sync signal 2506 that can control the low power local oscillator (LF LO) at the receiver 2500. The pilot channel of receiver 2500 at offset frequency $\Delta\omega_1$ carries the one-zero pattern p(k) 2504. This one-zero pattern is phase and frequency synchronized to $\cos(\Delta\omega_1)$ 2502 in the transmitter. Since $\Delta\omega_1$, $\Delta\omega_2$, and $\Delta\omega_3$ are integer multiples of each other, the pilot 2504 may also provide the sync signal 2506 for the other channels. At the transmitter, the information-bearing signal and pilot channel 2504 can be assigned different power levels. For the pilot signal 2504, the SNR does not have to be very high since it only needs to lock a LF LO in a phase lock loop (PLL) configuration that creates the offset frequencies.

In addition to the phase and frequency synchronization, the pilot signal 2504 can also provide a reference for the symbol timing and the frame timing on the other channels. The rising and falling edges of the zero-one pattern can be used for bit timing purposes. For frame timing, the one-zero sequences, whose length corresponds to the frame length, can be inverted and alternated. For example, for a frame length corresponding to 6 pilot symbols (note that a pilot symbol may be longer than the data symbols on the other channels; the pilot rate may be 32 kb/s whereas the data rate may be 320 kb/s) two sequences would be needed: 101010 and 010101. By alternating the sequences, we obtain a frame sync at the boundary of two sequence: 101010, 010101, 101010, etc. Alternatively, the frame sync may be embedded on the information-bearing channels itself, i.e. a specific bit pattern on the information-bearing channel may indicate the start of a frame. In another embodiment, the frame timing may be indicated by a simple duplication at the frame boundary of a 1 or 0 bit in the alternating 1-0 sequence of the pilot channel.

The circuit results in a very low-current receiver that can operate below 1 mW levels. By properly dimensioning the system (selection of binary data and reference signals, off harmonic frequency offsets, all based on 32 kHz), a high-performance, robust system results. Self-synchronization is achieved by including a one-zero pattern as pilot channel.

III. Wake-Up Assisted Sniff Link with Sub-Rating

In a Bluetooth system, connection establishment can take quite some power since two devices need to find each other both in time and in frequency. A Bluetooth device in standby wakes up once every 1.28 s at a hop carrier frequency which changes every new wake-up event. If another device wants to make a connection, it shall page a unique ID continuously on a number of (up to 32 different) carrier frequencies until the standby unit responds. Therefore, most Bluetooth accessories, like a voice headset, a stereo headset or a watch, are placed in a sniff mode once the user turns on the devices. In the sniff mode, there is no time or frequency uncertainty. Instead, the slaves ("accessories") are time and frequency locked to the master (i.e., mobile device, phone, etc.). Both master and slave wake up at pre-defined times and frequencies, which is very power efficient.

Figure 26:
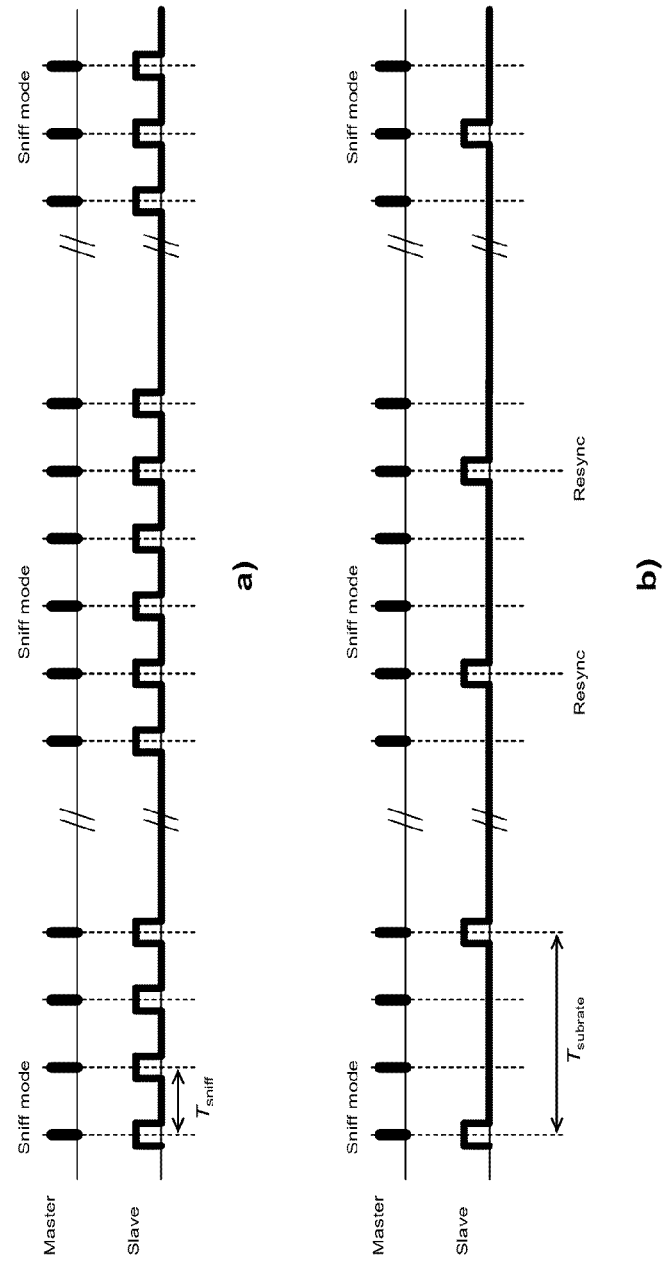
FIG. 26 is an illustration of a timing chart of a Bluetooth link without and without sub-rating.

A conventional sniffed link 2600 is shown in FIG. 26. Both master and slave wake-up at the sniff event time with a sniff interval of $T_{sniff}$ (and typically $T_{sniff}$=1.28 s). A further power reduction in the slave can be realized by applying sub-rating. In this case, the slave will not wake-up at every sniff event, but at every $N^{th}$ sniff event. The sub-rate interval $T_{subrate}$ becomes N times the sniff interval $T_{sniff}$ reducing the duty cycle by a factor of N. A sub-rate with N=3 is shown in graph "b" of FIG. 26. It should be understood that a "sniff" event refers to herein as a connection and/or data transfer between the slave and master.

According to various embodiments, sub-rating refers to a standard feature described in the Bluetooth specifications. By applying sub-rating in the slave, the power consumption in the slave can be reduced considerably. Sub-rating maintains the latency from the slave to the master; that is, although the slave typically wakes up every N sniff events, if the slave needs to contact the master, the slave can do so at the next coming sniff event. As such, the latency from slave to master is maximally $T_{sniff}$ although the sub-rate interval, $T_{subrate}$, can be much longer. Yet, the latency from the master to the slave has been increased from $T_{sniff}$ to $T_{subrate}$. In order to get the same latency, the slave would need to listen every $T_{sniff}$ and which is the same the sniff situation that we started with. However, a combination of Bluetooth with the dfTRSS wake-up radio, which is described above in the section titled "LOW POWER RADIO SYSTEM," solves this issue. As previously described in some embodiments, the low power radio system is a system that uses a Transmit Reference scheme with a LF frequency offset between the information signal and the reference signal and only this offset frequency, which is in the order of a few kHz to a few MHz, has to be recreated accurately in the receiver. The RF signal can be mapped directly to baseband by self-mixing. With this dfTRSS system, the peak current consumption can be lowered well below 0.1 mA. With a duty cycle of ~1% (for example), the wake-up radio can operate on an average current close to 1 µA.

Figure 27:
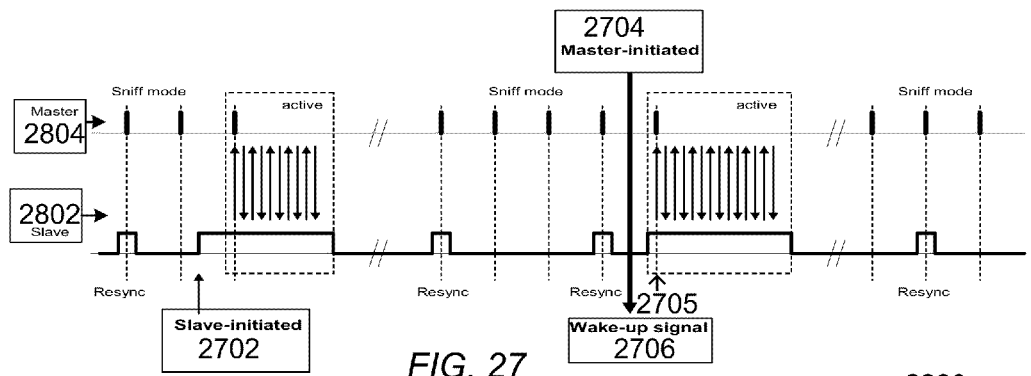
FIG. 27 illustrates combining sniff sub-rating with a wake-up radio in accordance with an embodiment of the present invention.
Figure 28:
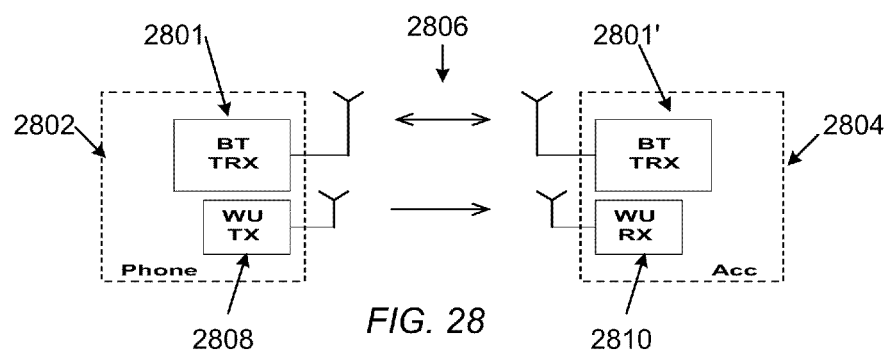
FIG. 28 is a block diagram of wake-up radio system in accordance with an embodiment of the present invention.

Referring to FIGS. 27-28, this uni-directional wake-up radio 2808 located in a master 2802 is able to wake up the slave 2804 in the Bluetooth system 2800 (or other short-range system) using a wake-up sequence that is unique to the slave 2804. Since the wake-up radio 2808 has an architecture that allows very low power consumption, the wake-up receiver 2810 can operate continuously, or at an interval considerably shorter than the sub-rate interval $T_{subrate}$.

The slave 2804 will respond to a master-initiated wakeup message 2704 containing a wake-up signal 2706 by contacting the Bluetooth master 2802 at the next coming sniff event 2705. Note that the auxiliary wake-up radio 2808 only triggers the slave 2804 to wake up. The auxiliary wake-up radio 2808 does not send the information that needs to be sent from the master to the slave, according to some embodiments. FIG. 27 illustrates at least one embodiment of this concept. In case of a slave-initiated action 2702, the latency is $T_{sniff}$ due to the duty cycle of the sniff events established by the master 2802. In case of a master-initiated action 2704, the latency is still $T_{sniff}$ despite the much longer $T_{subrate}$, caused by the intervention of the wakeup radio 2802.

An exemplary hardware configuration 2800 of the current disclosure is shown in FIG. 28 according to some embodiments. A Bluetooth transceiver 2801, 2801' is located both in the mobile device (master) 2802 and accessory (slave) 2804 for the data communications. Most of the time, the Bluetooth link 2806 is in the sniff mode. A wake-up transmitter 2808 is located in the master 2802 (e.g., mobile device, phone, or other computing device) and a wake-up receiver 2810 is located in the slave 2804. While the Bluetooth receiver 2801' in the slave 2804 can be in deep sleep in between the resynchronization events, the slave 2804 can be woken up by the wake-up radio 2810 after receiving a signal from the wake-up radio 2808 of the master 2802.

The power in the slave 2804 eventually depends on the sub-rate interval (ignoring the standby current in the wake-up radio). This sub-rate interval may be limited by the accuracy of the clocks used by the master and the slave. The clocks may drift somewhat. As a result, the timing of the master and slave "slides" or becomes out of sync relative to each other ("sliding effect"). Usually, this sliding effect is compensated periodically at the sniff events when the slave resynchronizes, but the interval must be small enough to allow for this compensation (i.e., the slave may not be time drifting out of the window where it would completely miss the master). The robustness may be improved by increasing the scan window, but this will result in a higher duty cycle (and thus, more power consumption) and eventually puts a floor to the achievable duty cycle. With a 40 ppm mutual drift between low power oscillators (LPOs) of the devices, for scan window of 100 µs, the maximum interval may be limited to 2.5 s. With $T_{sniff}$=1.28 s, this would limit the sub-rating factor, N, to 2.

For many accessories (e.g., a remote display, remote user interface (UI), etc.), an active connection only is needed if a triggering event occurs (e.g., an incoming call, a UI interaction by pushing a button, or other triggering occurrence). In these event-driven applications, a much longer interval may be employed in order to reduce the power consumption in the slave. In the above section entitled "AUTOMATIC RECONNECTION OF A PREVIOUSLY LOST CONNECTION IN A FREQUENCY HOPPING COMMUNICATION SYSTEM," a method was described how to keep a master and slave virtually synchronized while no communication can happen to compensate for the mutual LPO drift. In the fast auto-reconnect mode, the slave is in a low duty cycle mode scanning during a short window at a fixed period (e.g. 1.28 s), whereas the master transmits paging messages at the same fixed period, but increasing the number of paging messages as time elapses and no reconnection is established. After 30 minutes in the fast auto-reconnect mode, the master will move to the slow auto-reconnect mode where the master stops increasing the number of paging messages, but stays at a fixed duty cycle.

Figure 29:
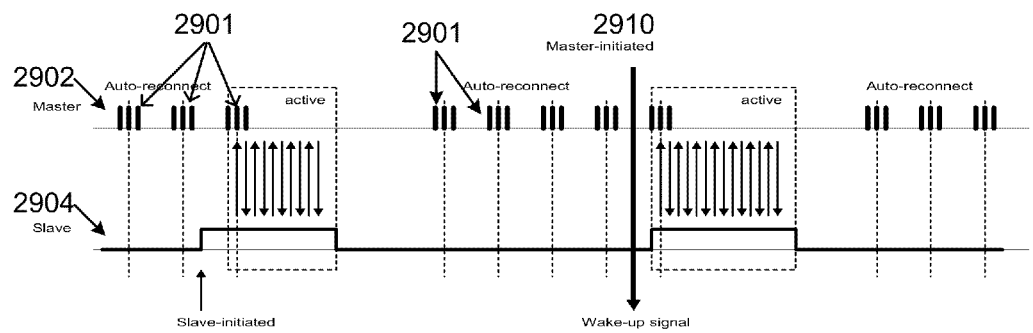
FIG. 29 is an illustration of a timing chart of a wake-up radio in auto-reconnect mode in accordance with an embodiment of the present invention.

Referring now to FIG. 29, an auto-reconnect will be triggered by a loss of the connection between the master and the slave. This may happen when the devices get out of range. However, it can also be enforced by just turning off the Bluetooth transceiver of the slave deliberately. When no messages are exchanged over the air, the master will assume a link loss and will start the auto-reconnect. The slave knows the auto-reconnect procedure and will know exactly when and on which frequency the master will transmit the paging messages. The master can keep the short interval of $T_{recovery}$ (similar to $T_{sniff}$ and typically 1.28 s) to send the paging messages. The slave can be turned off (except its LPO is running that will keep track of the master's auto-reconnect). At any time, the slave may wake-up and respond to the master's page message. This will results in a short latency (maximum of 1.28 s) from the slave to the master while the duty cycle in the slave can be very low (e.g., there may only be three user interactions in a day and the slave can be off for hours). For the latency from the master to the slave, a uni-directional wake-up radio is used with a transmitter in the master and a receiver in the slave.

This concept is very similar to the concept with sniff and sub-rating as described before and visualized in FIGS. 27-28; however, instead of sniff events, recovery events may be used. As time elapses, the master increases the number of page messages that are sent at each recovery event.

A timing diagram 2900 of the combination of Bluetooth auto-reconnect with the wake-up radio is shown in FIG. 29. A train of page messages 2901 (ID packets) is sent over the Bluetooth interface every $T_{recovery}$. The slave 2904 may respond to the Bluetooth transmission of the master 2902 at any time. If the master 2902 wants to carry information to the slave 2904, the master 2902 first wakes up the slave 2904 via sending a message 2910 to the wake-up radio and in response thereto, the slave 2904 responds on the Bluetooth interface.

The Figures illustrate the architecture, functionality, and operation of possible implementations of systems and methods according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by a human or special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A radio system comprising:
   a slave comprising a short-range transmitter and a wake-up radio receiver,
   wherein the slave is configured to have a sniff sub-rating with a master, the master being configured to wake up the slave via the wake-up radio receiver, wherein the master and slave define a sniff period ($T_{sniff}$) comprising a period between successive sniff event times, wherein the slave is scheduled to wake-up once every predetermined number of sniff periods, the predetermined number being greater than one;
   wherein when the master initiates communication with the slave prior to the slave's scheduled wake-up time by transmitting a wakeup message to the slave, a latency associated with the slave's response to the wakeup message does not exceed the sniff period ($T_{sniff}$), and
   wherein when the slave initiates communication with the master prior to the slave's scheduled wake-up time, a latency associated with the slave's communication with the master does not exceed the sniff period ($T_{sniff}$).

2. The radio system of claim 1, wherein the sniff sub-rating allows the slave and master to establish a latency period of about 1.28 s.

3. The radio system of claim 1, wherein when the slave wakes-up once every predetermined number of sniff periods, the slave resynchronizes a clock associated with the slave with a clock associated with the master.

4. The radio system of claim 1, wherein the master is configured to wake up the slave via the wake-up radio receiver so that during the next sniff period the slave wakes up and communicates with the master.

5. The radio system of claim 1, wherein the predetermined number of sniff periods comprise a subrating period ($T_{subrate}$).

6. The radio system of claim 1, further comprising the master, the master comprising a short-range transmitter to communicate with the the slave after the slave has been woken up via the wake up radio receiver.

7. The radio system of claim 1, wherein the master further comprises a wake-up transmitter to send the wake-up receiver a wake up message to alert the slave to respond at a next sniff period.

8. The radio system of claim 1, wherein the master comprises a mobile telecommunications device.

9. The radio system of claim 1, wherein the slave comprises a Bluetooth accessory.

10. The radio system of claim 9, wherein the slave comprises one of a headset or a watch.

11. The radio system of claim 1, wherein the slave connects to the master over a Bluetooth network.

12. The radio system of claim 1, wherein the slave is configured to achieve a standby current of about 1 µA with a latency of about 1 s.

13. A mobile device comprising:
   a wake-up transmitter to initiate communication with slave device by sending a wake-up message to the slave device to wake-up the slave device prior to the slave device's scheduled wake-up time such that the slave device responds to the mobile device during the next sniff interval, wherein the slave device has a sniff sub-rating with the mobile device such that the slave device is scheduled to wake-up once every predetermined number of sniff intervals, the predetermined number being greater than one, wherein when the slave device initiates communication with the master prior to the slave device's scheduled wake-up time, the slave device communicates with the master during the next sniff interval; and
   a short-range transmitter to communicate with the slave device during the next sniff interval once the slave device has been woken up.

14. The radio system of claim 13, wherein the mobile device is configured to communicate with the slave device and to send the wake-up message to the slave device over a Bluetooth network.

15. The radio system of claim 13, wherein the wake up transmitter is a uni-directional radio device.

16. The radio system of claim 13, wherein the wake-up transmitter and the short-range transmitter comprise common hardware components to form a unitary transmitter.

17. A method of establishing communication between a master device and a slave device over a short-range network, the method comprising:
   establishing a sniff period between the master device and the slave device; and
   establishing a subrating period between the master device and the slave device, wherein the subrating period is greater than the sniff period, the slave device being scheduled to wake-up once every subrating period;
   wherein when the master device initiates communication with the slave device by sending a wakeup message to the slave device causing the slave device to wake up prior to the slave device's scheduled wake-up time, the slave device communicates with the master device during the next sniff period, and
   wherein when the slave device initiates communication with the master device prior to the slave's scheduled wake-up time, the slave device communicates with the master device during the next sniff period.

18. The method of claim 17, wherein the sending a wakeup message comprises a wake-up transmitter associated with the master device sending a wake-up message to a wake-up receiver associated with the slave device so that when the wake-up receiver receives the wake-up message, the slave device communicates with the master during the next sniff period.

19. The method of claim 17, wherein when the slave device wakes-up once every subrating period, the slave device resynchronizes a clock associated with the slave device with a clock associated with the master device.

20. The method of claim 17, wherein the sending a wakeup message comprises causing the master device to wake-up the slave device using a wake-up sequence that is unique to the slave device.

* * * * *